US012672003B2

(12) United States Patent
Celozzi et al.

(10) Patent No.: US 12,672,003 B2
(45) Date of Patent: Jun. 30, 2026

(54) METHODS, DEVICES AND SYSTEM FOR LAWFUL INTERCEPTION BY SUBSCRIBING TO A NOTIFICATION

(71) Applicant: Telefonaktiebolaget LM Ericsson (PUBL), Stockholm (SE)

(72) Inventors: Giuseppe Celozzi, Naples (IT); Daniele Gaito, Naples (IT); Francesco Attanasio, Roccapiemonte (IT); Gennaro Falanga, Torre Annunziata (IT); Gianpaolo Di Mauro, Nocera Superiore (IT); Rosa Catapano, Salerno (IT)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 305 days.

(21) Appl. No.: 18/557,372

(22) PCT Filed: Apr. 27, 2021

(86) PCT No.: PCT/SE2021/050382
§ 371 (c)(1),
(2) Date: Oct. 26, 2023

(87) PCT Pub. No.: WO2022/231483
PCT Pub. Date: Nov. 3, 2022

(65) Prior Publication Data
US 2024/0381098 A1 Nov. 14, 2024

(51) Int. Cl.
*H04W 12/00* (2021.01)
*H04W 12/69* (2021.01)
*H04W 12/80* (2021.01)

(52) U.S. Cl.
CPC .......... *H04W 12/80* (2021.01); *H04W 12/69* (2021.01)

(58) Field of Classification Search
None
See application file for complete search history.

(56) References Cited

U.S. PATENT DOCUMENTS

2019/0306251 A1* 10/2019 Talebi Fard .......... H04W 76/10
2020/0245229 A1* 7/2020 Horn ..................... H04W 48/10
(Continued)

OTHER PUBLICATIONS

ETSI TS 103 221 2 v1 4 1 (Apr. 2021) Lawful Interception (LI) Internal Network Interfaces Part 2: X2 X3.
(Continued)

*Primary Examiner* — Brandon M Renner
(74) *Attorney, Agent, or Firm* — Baker Botts L.L.P.

(57) ABSTRACT

A method performed by a Lawful Interception Administration Function device (102) is disclosed. The method comprises receiving from a Law Enforcement Agency (101), a first request message for subscribing to a notification of an event, wherein the event is a monitoring event or a Non-IP Data Delivery event; sending a second request message, to a Network Exposure Function, NEF, device (103) comprising an Intercept Related Information Point of Interception, IRI-POI, (104) to subscribe to the notification of the event by provisioning the IRI-POI in the NEF device; and receiving a subscribe response message from the NEF device confirming the subscription to the notification of the event. Further, the embodiments relate to the NEF device, the LI ADMF device, the Mediation and Delivery Function 2 device, their corresponding methods as well as computer programs, carriers of such computer programs and computer program products of such computer programs.

10 Claims, 9 Drawing Sheets

(56) References Cited

U.S. PATENT DOCUMENTS

| | | | |
|---|---|---|---|
| 2021/0067955 A1* | 3/2021 | Rao ....................... | H04L 63/306 |
| 2023/0179518 A1* | 6/2023 | Vangala ............ | H04W 28/0252 |
| | | | 709/238 |

OTHER PUBLICATIONS

ETSI TS 103 221-1 V1.6.1 (Dec. 2019); Lawful Interception (LI); Internal Network Interfaces; Part 1: X1.

ETSI TS 103 221-2 V1.1.1 (Mar. 2019); Lawful Interception (LI); Part 2: Internal Network Interface X2/X3 for Lawful Interception.

3GPP TS 23.501 V16.3.0 (Dec. 2019); 3rd Generation Partnership Project; Technical Specification Group Services and System Aspects; System architecture for the 5G System (5GS); Stage 2 (Release 16).

3GPP TS 23.502 V16.3.0 (Dec. 2019); 3rd Generation Partnership Project; Technical Specification Group Services and System Aspects; Procedures for the 5G System (5GS); Stage 2 (Release 16).

3GPP TS 29.500 V16.2.1 (Jan. 2020); 3rd Generation Partnership Project; Technical Specification Group Core Network and Terminals; 5G System; Technical Realization of Service Based Architecture; Stage 3 (Release 16).

3GPP TS 29.510 V16.2.0 (Dec. 2019); 3rd Generation Partnership Project; Technical Specification Group Core Network and Terminals; 5G System; Network Function Repository Services; Stage 3 (Release 16).

3GPP TS 33.127 V16.2.0 (Dec. 2019); 3rd Generation Partnership Project; Technical Specification Group Services and System Aspects; Security; Lawful Interception (LI) architecture and functions (Release 16).

ETSI TS 103 120 V1.5.1 (Mar. 2020); Lawful Interception (LI); Interface for warrant information.

3GPP TS 33.128 V16.1.0 (Dec. 2019); 3rd Generation Partnership Project; Technical Specification Group Services and System Aspects; Security; Protocol and procedures for Lawful Interception (LI); Stage 3 (Release 16).

ETSI TS 103 221-1 v1.8.1 (Apr. 2021) Lawful Interception (LI); Internal Network Interfaces; Part 1: X1.

3GPP TSG-SA3 Meeting #81-LI-e-a; Online, Apr. 12, 2021-Apr. 16, 2021; Change Request; 33.127 CR 0116 rev 2 Current version: 17.0.0; Title: LI for NIDD in 5GS in TS 33.127 (s3i210217).

3GPP TSG SA3 Meeting #81-LI-e-a; Online, Apr. 12, 2021-Apr. 16, 2021; Change Request; 33.128 CR 0171 Rev 1 Current version: 17.0.0; Title: LI for NIDD in 5GS in TS 33.128 (s3210218).

3GPP TS 33.127 V17.0.0 (Mar. 2021); 3rd Generation Partnership Project; Technical Specification Group Services and System Aspects; Security; Lawful Interception (LI) architecture and functions (Release 17).

PCT International Search Report issued for International application No. PCT/SE2021/050382—Jan. 26, 2022.

PCT Written Opinion of the International Searching Authority issued for International application No. PCT/SE2021/050382—Jan. 26, 2022.

EPO Communication pursuant to Rule 164(1) EPC issued for Application No. / Patent No. 21939495.4-1213 / 4331254 PCT/ SE2021050382—Feb. 20, 2024.

3GPP TS 33.127 v16.7.0 (Mar. 2021) 3rd Generation Partnership Project; Technical Specification Group Services and System Aspects; Security; Lawful Interception (LI) architecture and functions (Release 16).

Summary of the Notice of Preliminary Rejection issued for Korean Patent Application No. 2023-7040587—May 16, 2025.

Extended European Search Report issued for Application No. / Patent No. 21939495.4-1206 / 4331254 PCT / SE2021050382— Jun. 3, 2024.

EPO Communication Pursuant to Rules 70(2) and 70a(2) EPC issued for Application No. / Patent No. 21939495.4-1206 / 4331254 PCT / SE2021050382—Jun. 20, 2024.

* cited by examiner

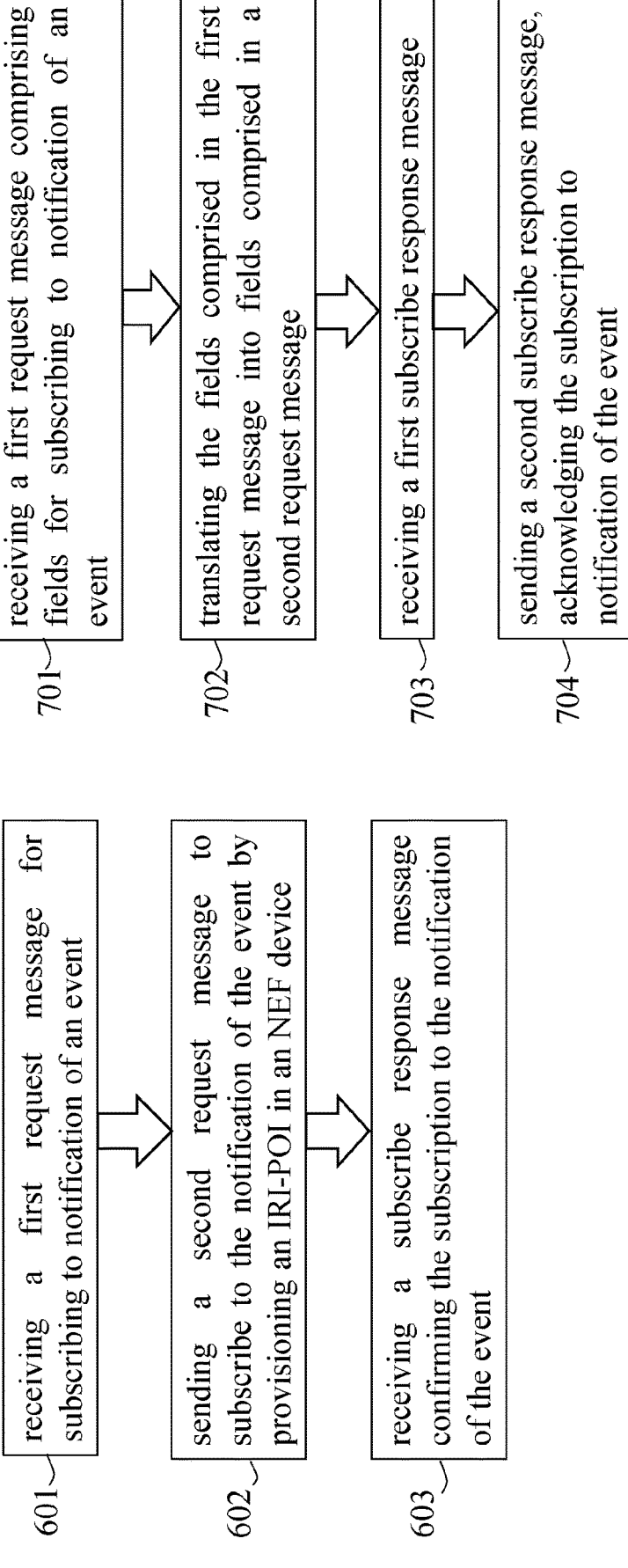

701 receiving a first request message comprising fields for subscribing to notification of an event 702 translating the fields comprised in the first request message into fields comprised in a second request message 703 receiving a first subscribe response message 704 sending a second subscribe response message, acknowledging the subscription to notification of the event

Figure. 7

601 receiving a first request message for subscribing to notification of an event 602 sending a second request message to subscribe to the notification of the event by provisioning an IRI-POI in an NEF device 603 receiving a subscribe response message confirming the subscription to the notification of the event

Figure. 6

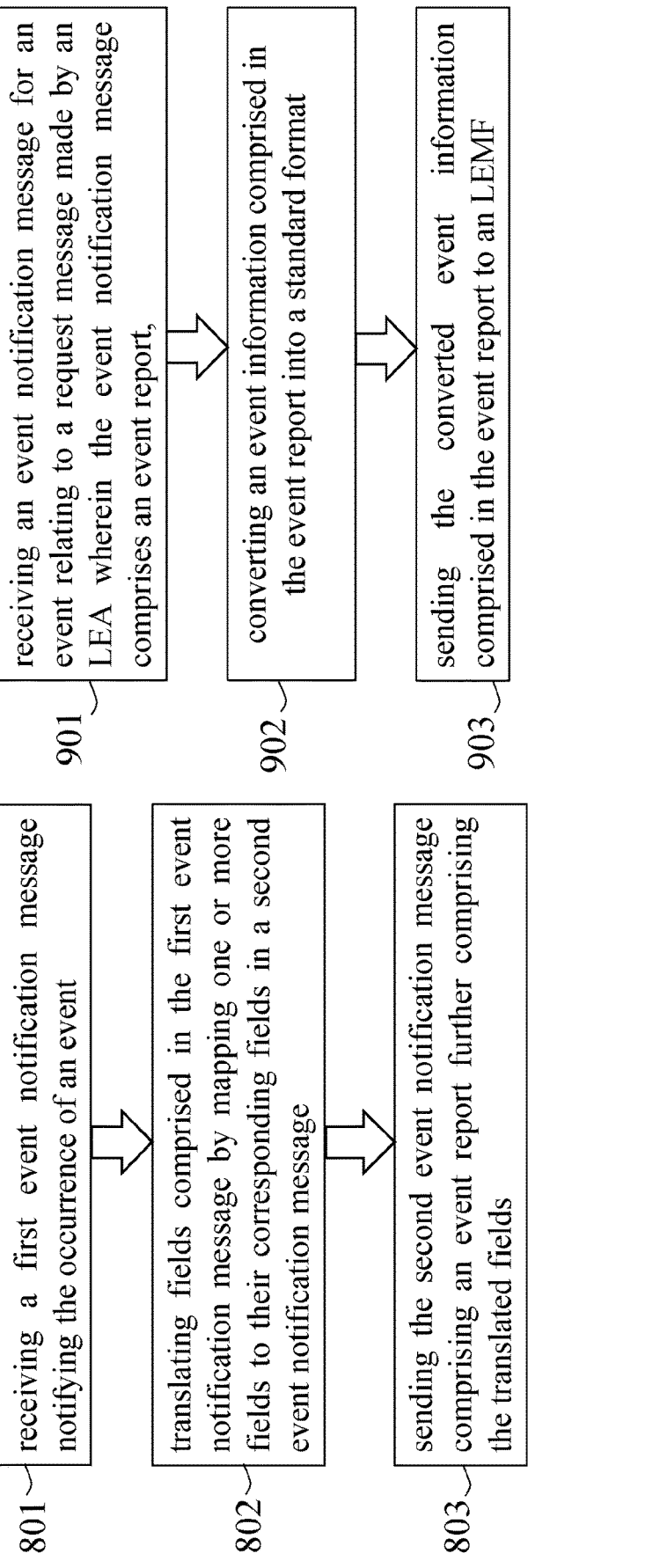

receiving an event notification message for an event relating to a request message made by an LEA wherein the event notification message comprises an event report, 901 converting an event information comprised in the event report into a standard format 902 sending the converted event information comprised in the event report to an LEMF 903

Figure. 9 receiving a first event notification message notifying the occurrence of an event 801 translating fields comprised in the first event notification message by mapping one or more fields to their corresponding fields in a second event notification message 802 sending the second event notification message comprising an event report further comprising the translated fields 803

Figure. 8

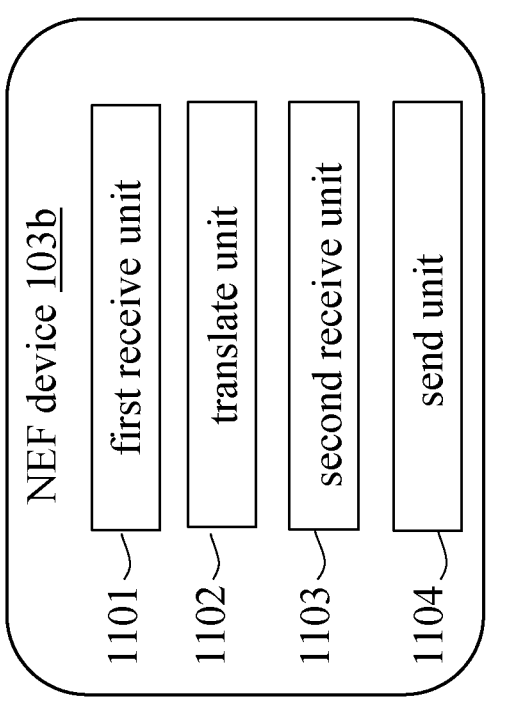
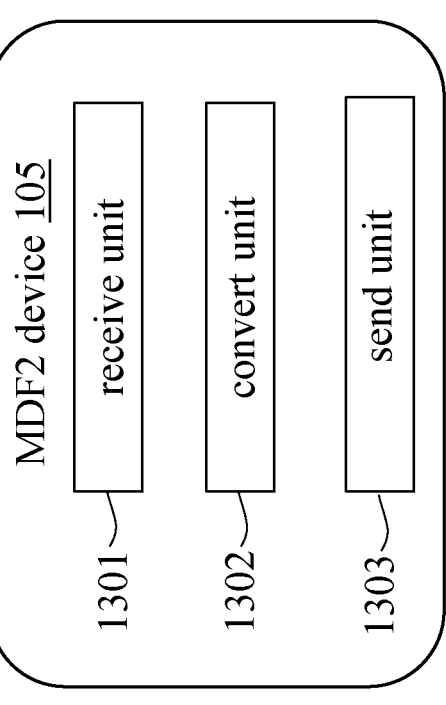
Figure. 11
Figure. 13
Figure. 10
Figure. 12

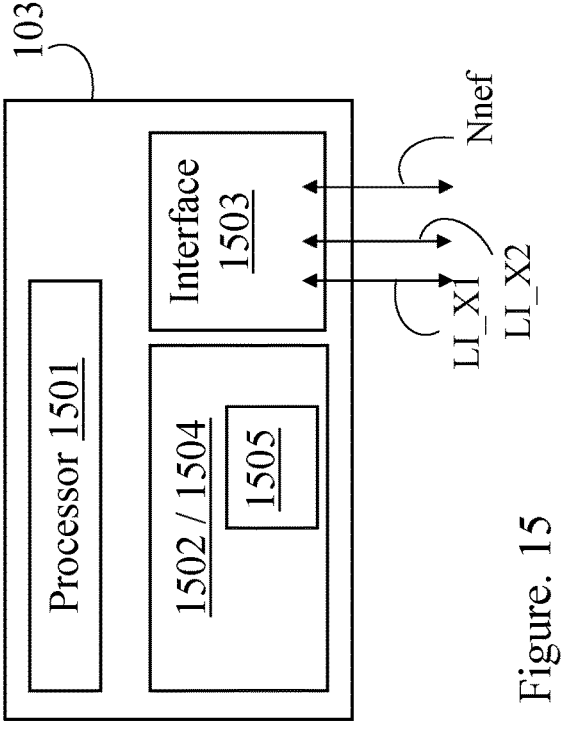
Figure. 15
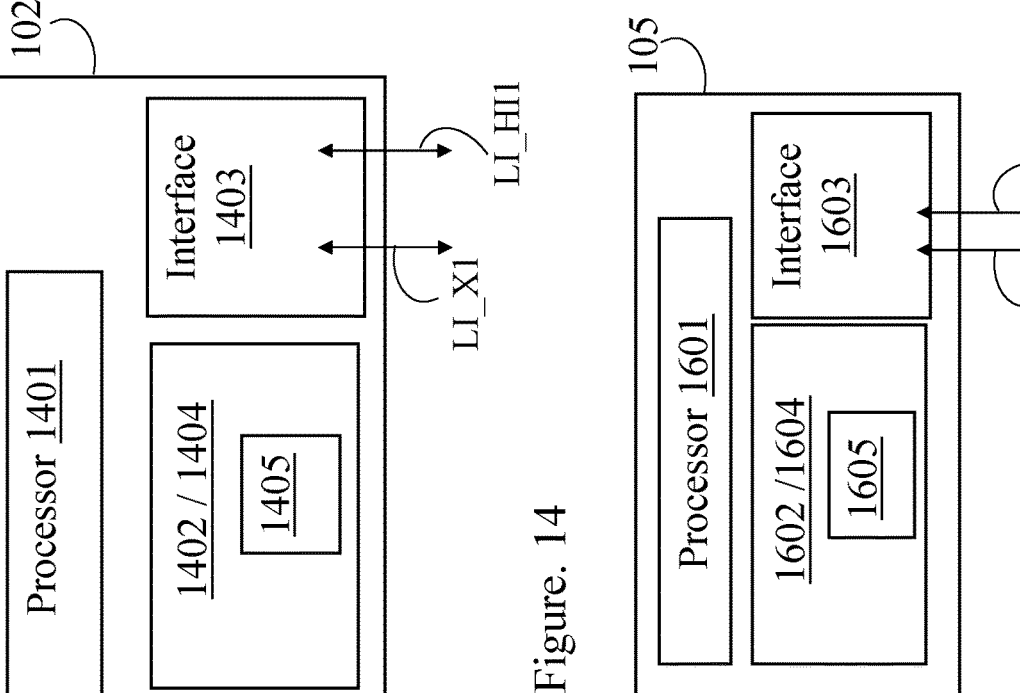
Figure. 14
Figure. 16

METHODS, DEVICES AND SYSTEM FOR LAWFUL INTERCEPTION BY SUBSCRIBING TO A NOTIFICATION

PRIORITY

This nonprovisional application is a U.S. National Stage Filing under 35 U.S.C. § 371 of International Patent Application Serial No. PCT/SE2021/050382 filed Apr. 27, 2021 and entitled "METHODS, DEVICES AND SYSTEM FOR LAWFUL INTERCEPTION BY SUBSCRIBING TO A NOTIFICATION" which is hereby incorporated by reference in its entirety.

TECHNICAL FIELD

Embodiments herein relate to Lawful Interception. More specifically, the embodiments relate to a Network Exposure Function device, a Lawful Interception Administration Function device, a Mediation and Delivery Function 2 device, their corresponding methods, as well as computer programs, carriers of such computer programs and computer program products comprising computer programs.

BACKGROUND

At the core of most modern networks and services is typically a cloud and virtualization-based platform. This is also the case for Fifth Generation (5G) networks, where the system architecture is defined to support data connectivity and services enabling deployments to use techniques such as Network Function Virtualization (NFV). Additionally, the 5G system architecture leverages on service-based interactions between Control Plane (CP) Network Functions (NF) where identified. A 5G Service Based Architecture (SBA) is centered around services that can register themselves and subscribe to other services. This enables a more flexible development of new services, as it allows to connect to other components without introducing specific new interfaces. The 5G SBA is specified in e.g. 3rd Generation Partnership Project (3GPP) Technical Specification (TS) 3GPP TS 23.502 V16.6.0 (2020 September).

The establishment and management of a Lawful Interception (LI) process is enabled via a Lawful Interception Internal Interface 1 (LI_X1) interface, for the communication between two entities: a Lawful Interception Administration Function (LI ADMF) and a Network Element (NE) performing the interception. Communication over the LI_X1 interface consists of a request followed by a response. Requests may be sent in either direction i.e. with either the LI ADMF or NE initiating the request. The side initiating the request is called the "Requester" while the other side responding is called the "Responder".

The use of a Network Exposure Function (NEF) in LI for the purposes of public safety (e.g. detecting number of people in a geographic area in view of Covid-19) is missing or is incomplete in 5G LI standards. For instance, existing LI architectures do not allow to report monitoring events for purposes of public safety from a NEF to a Law Enforcement Monitoring Facility (LEMF).

SUMMARY

An object of the invention is to enable utilization of information from an LI system for non-LI purposes other than LI.

To achieve said object, in a first aspect, there is provided a method performed by a LI ADMF device. The method comprises receiving from a Law Enforcement Agency (LEA), a first request message for subscribing to a notification of an event, wherein the event is a monitoring event or a Non-IP Data Delivery (NIDD) event. The method further comprises sending a second request message, to the NEF device comprising an Intercept Related Information Point of Interception (IRI-POI) to subscribe to the notification of the event by provisioning the IRI-POI in the NEF device. The method still further comprises receiving a subscribe response message from the NEF device confirming the subscription to the notification of the event.

Hereby is enabled an implementation of a NEF in association with LI, which allows to report one or more exposure management monitoring events and/or one or more NIDD monitoring events, that may be used for public safety and thus, enhancing investigation capabilities in LI to other areas outside the typical scope of LI.

In a second aspect, there is provided a method performed by a NEF device. The method comprises receiving at an IRI-POI provisioned in the NEF device from the LI ADMF device a first request message comprising fields for subscribing to a notification of an event. The method further comprises translating the fields comprised in the first request message into fields comprised in a second request message. The method further comprises receiving at the IRI-POI from the NEF, a first subscribe response message. The method further comprises sending to the LI ADMF device, a second subscribe response message, acknowledging the subscription to the notification of the event.

In a third aspect, there is provided a method performed by a NEF device. The method comprises receiving at the IRI-POI provisioned in the NEF device, a first event notification message notifying the occurrence of an event. The method further comprises translating the fields comprised in the first event notification message by mapping one or more fields comprised in the first event notification message to their corresponding fields in a second event notification message. The method further comprises sending to a Mediation and Delivery Function 2 (MDF2) device, the second event notification message comprising an event report comprising the translated fields.

In a fourth aspect, there is provided a method performed by a MDF2 device. The method comprises receiving from a NEF device, an event notification message for an event relating to a request message made by a LEA wherein the event notification message comprises an event report, and wherein the event is a monitoring event or a NIDD event. The method further comprises converting an event information comprised in the event report into a standard format; and sending, via a Lawful Interception Handover Interface 2 (LI_HI2) interface, the converted event information comprised in the event report to a Law Enforcement Monitoring Facility, LEMF.

In a fifth aspect, there is provided an LI ADMF device. The LI ADMF device comprises one or more processor(s) and a memory, the memory containing instructions executable by the one or more processor(s), to: receive from the LEA a first request message for subscribing to a notification of an event, wherein the event is a monitoring event or a NIDD event; send a second request message to the NEF device comprising the IRI-POI to subscribe to the notification of the event by provisioning the IRI-POI in the NEF device; and receive a subscribe response message from the NEF device confirming the subscription to the notification of the event.

In a sixth aspect, there is provided a NEF device. The NEF device comprises one or more processor(s) and a memory, the memory containing instructions executable by the one or more processor(s) to: receive at the IRI-POI provisioned in the NEF device, from the LI ADMF device, a first request message comprising fields for subscribing to a notification of an event; translate the fields comprised in the first request message into fields comprised in a second request message; receive at the IRI-POI from the NEF, a first subscribe response message; and send to the LI ADMF device, a second subscribe response message, acknowledging the subscription to the notification of the event.

In a seventh aspect, there is provided a NEF device. The NEF device comprises one or more processor(s) and a memory, the memory containing instructions executable by the one or more processor(s), to receive at the IRI-POI provisioned in the NEF device, a first event notification message notifying an occurrence of an event; translate fields comprised in the first event notification message by mapping one or more fields comprised in the first event notification message to their corresponding fields in a second event notification message; and send to the MDF2 device, the second event notification message comprising an event report further comprising the translated fields.

In an eight aspect, there is provided an MDF2 device. The MDF2 device comprises one or more processor(s) and a memory, the memory containing instructions executable by the one or more processor(s), to: receive from the NEF device, an event notification message for an event relating to a request message made by the LEA wherein the an event notification message comprises an event report, and wherein the event is a monitoring event or a NIDD event; convert an event information comprised in the event report into a standard format sent via the LI_HI2 interface; and send the converted event information comprised in the event report to a LEMF.

In a ninth aspect, there is provided a computer program, comprising instructions which, when executed on the LI ADMF device, cause the LI ADMF device to carry out the methods according to the first aspect and/or the embodiments of the first aspect.

In a tenth aspect, there is provided a carrier containing the computer program according to the ninth aspect, wherein the carrier is one of an electronic signal, optical signal, radio signal, or computer-readable storage medium.

In an eleventh aspect, there is provided a computer program product comprising a computer readable storage means on which a computer program according to the ninth aspect is stored.

In a twelfth aspect, there is provided a computer program, comprising instructions which, when executed on a NEF device cause the NEF device to carry out the method according to the second aspect and/or the third aspect, and/or the embodiments of the second aspect and/or the third aspect.

In a thirteenth aspect, there is provided a carrier containing the computer program according to the twelfth aspect, wherein the carrier is one of an electronic signal, optical signal, radio signal, or computer-readable storage medium.

In a fourteenth aspect, there is provided a computer program product comprising a computer readable storage means on which a computer program according to the twelfth aspect is stored.

In a fifteenth aspect, there is provided a computer program product comprising a computer readable storage means on which a computer program according to the ninth aspect is stored.

In a sixteenth aspect, there is provided a computer program, comprising instructions which, when executed on the MDF2 device cause the MDF2 device to carry out the methods according to the fourth aspect, and/or the embodiments of the fourth aspect.

In a seventeenth aspect, there is provided a carrier containing the computer program according to the sixteenth aspect, wherein the carrier is one of an electronic signal, optical signal, radio signal, or computer-readable storage medium.

In an eighteenth aspect, there is provided a computer program product comprising a computer readable storage means on which a computer program according to the sixteenth aspect is stored.

In an embodiment according to the first and fifth aspects, the first request message comprises an LITaskObject to perform LI, wherein the LITaskObject comprises at least one of the fields: a communication address or a technical identifier used to identify a target of a task, type of monitoring event, mode of monitoring event.

In an embodiment according to the first and fifth aspects, the first request message comprises a field TargetIdentifier, wherein the TargetIdentifier comprises a parameter or enumerated value LocationArea5G, wherein the LocationArea5G is any one of, a list of Evolved Universal Terrestrial Radio Access (E-UTRA) cell identifiers, or a list of New Radio (NR) cell identifiers, or a list of Tracking Areas, or a list of civic addresses, or a geographical area, or a combination of any of these.

In another embodiment according to the first and fifth aspects, the type of monitoring event field is Monitoring-Type, wherein the MonitoringType comprises a parameter or enumerated value NUMBER_OF_UES_IN_AN_AREA, wherein the NUMBER_OF_UES_IN_AN_AREA indicates the number of User Equipment (UE) in a given geographic area.

In yet another embodiment according to the first and fifth aspects, the mode of monitoring event field is Monitoring-Mode, wherein the MonitoringMode comprises a parameter or enumerated value event reporting mode, wherein the event reporting mode indicates reporting up to a maximum number of reports, periodic reporting along with periodicity, or reporting up to a maximum duration.

In a further embodiment according to the first aspect, the first and the second request messages comprise at least a RequestedData field for a NIDD event wherein the RequestedData field is used for monitoring of one or more events related to an Internet of Things, IoT, UE, and a MonitoringMode field, wherein the MonitoringMode field comprises a parameter or enumerated value event reporting mode, wherein the event reporting mode indicates reporting up to a maximum number of reports, periodic reporting along with periodicity or reporting up to a maximum duration.

In another embodiment according to the first and fifth aspects, the provisioning the IRI-POI is performed by a Lawful Interception Provisioning Function, LIPF.

In an embodiment according to the first and fifth aspects, the provisioning is performed via an LI_X1 interface.

In an embodiment according to the first and fifth aspects, the second request message comprises TaskDetails comprising at least one of the following fields: MonitoringType, TargetIdentifier and MonitoringMode.

In an embodiment according to the first and fifth aspects, sending the second request message invokes, in the NEF device, a Nnef_EventExposure_Subscribe Request message for a monitoring event or a Nnef_NIDDConfiguration_Create Request message for a NIDD event.

In an embodiment according to the second and sixth aspects, the first request message is received via an LI_X1 interface modified to communicate first request message comprising at least one of the following fields: Monitoring-Type, MonitoringMode, TargetIdentifier.

In an embodiment according to the second and sixth aspects, the MonitoringType comprises a parameter or enumerated value NUMBER_OF_UES_IN_AN_AREA, wherein the NUMBER_OF_UES_IN_AN_AREA indicates the number of UEs in a given geographic area.

In an embodiment according to the second and sixth aspects, the MonitoringMode comprises a parameter or enumerated value event reporting mode, wherein the event reporting mode indicates reporting up to a maximum number of reports, periodic reporting along with periodicity or reporting up to a maximum duration.

In an embodiment according to the second and sixth aspects, the TargetIdentifier field comprises a parameter or enumerated value locationArea5G, wherein the LocationArea5G is any one of, a list of E-UTRA cell identifiers, or a list of Tracking Areas, or a list of civic addresses, or a geographical area, or a combination of any of these.

In an embodiment according to the second and sixth aspects, translating the fields comprised in the first request message and translating the fields comprised in the second event notification message is performed by the IRI-POI provisioned in the NEF device by the LI ADMF device.

In an embodiment according to the second and sixth aspects, translating the fields comprised in the first request message to the fields comprised in the second event notification message is performed by the IRI-POI provisioned external to the NEF device by the LI ADMF device.

In an embodiment according to the second and sixth aspects, the MonitoringType field of the first request message is translated or mapped to an Event ID field of the second request message, wherein the event ID field comprises an event identifier NUMBER OF UES PRESENT IN A GEOGRAPHICAL AREA.

In an embodiment according to the second and sixth aspects, the MonitoringMode field of the first request message is translated or mapped to a parameter or enumerated value of Event Reporting Information field of the second request message, wherein the parameter or enumerated value is Event Reporting mode, wherein the Event Reporting mode is at least one of reporting up to a maximum number of reports, periodic reporting along with periodicity or reporting up to a maximum duration.

In an embodiment according to the second and sixth aspects, the TargetIdentifier field of the first request message is translated or mapped to Target of Event Reporting field of the second request message, wherein the Target of Event Reporting field comprises at least one of the following parameter or enumeration value: Generic Public Subscription Identifier (GPSI), Subscriber Permanent Identifier (SUPI), External Group Identifier, Internal Group Identifier, a specific User Equipment, a Packet Data Unit (PDU) Session, a group of UEs or any UE, or locationArea5G, wherein the LocationArea5G is any one of, a list of E-UTRA cell identifiers, or a list of Tracking Areas, or a list of civic addresses, or a geographical area, or a combination of any of these.

In an embodiment according to the second and sixth aspects, further comprises sending to a core network node, a third request message relating to the second request message to subscribe to the notification of the event; receiving from the core network node, a subscribe response message indicating subscribing to the notification of the event. The third request message is Namf_EventExposure_Subscribe Request and the subscribe response message is Namf_EventExposure_Subscribe Response.

In an embodiment according to the second and sixth aspects, the core network node is any one of Access and Mobility Management Function (AMF), Unified Data Management (UDM), Session Management Function (SMF), or Gateway Mobile Location Centre (GMLC).

In an embodiment according to the second and sixth aspects, the first request message comprises a Requested-Data field for a NIDD event, wherein the RequestedData comprises a parameter (or enumerated value) NIDD.

In an embodiment according to the second and sixth aspects, further comprising a MonitoringMode field comprising one or more parameters or one or more enumerated values of the Event Report Information.

In an embodiment according to the second and sixth aspects, further comprising a TargetIdentifier field comprising a communication address or a technical identifier used to identify a target of task.

In an embodiment according to the second and sixth aspects, the RequestedData field of the first request message is mapped or translated to a Event ID field of the second request message.

In an embodiment according to the second and sixth aspects, the MonitoringMode field of the first request message is mapped or translated to Event Reporting Information field of the second request message.

In an embodiment according to the second and sixth aspects, the field TargetIdentifier of the first Request message is mapped or translated to a Target of Event Reporting field of the second request message.

In an embodiment according to the second and sixth aspects, the field ListOfDIDs of the first Request message is mapped or translated to a Notification Target Address field of the second request message.

In an embodiment according to the third and seventh aspects, translating the comprised in the first event notification message is performed by the IRI-POI provisioned in the NEF device by the LI ADMF device.

In an embodiment according to the third and seventh aspects, translating the fields comprised in the first event notification message is performed by the IRI-POI provisioned external to the NEF device by the LI ADMF device.

In an embodiment according to the third and seventh aspects, the first event notification message comprises a field event identifier associated with a subscribed event.

In an embodiment according to the third and seventh aspects, comprising translating fields comprised in the second event notification message to fields comprised in a xIRI message.

In an embodiment according to the third and seventh aspects, the field event Identifier is mapped to a field NUMBER_OF_UES_IN_AN_AREA.

In an embodiment according to the third and seventh aspects, the field NUMBER OF UES PRESENT IN A GEOGRAPHICAL AREA is mapped to a field NUMBER_OF_USER_EQUIPMENTS.

In an embodiment according to the third and seventh aspects, the third event notification message is a xIRI message comprising the translated fields of second event notification message.

In an embodiment according to the third and seventh aspects, the field Target of Event Reporting of the message first event notification message is translated or mapped to a field Matched Target Identifier of the second event notification, wherein the field TARGET OF EVENT REPORT-ING comprises a parameter or enumerated value locationArea5G, wherein the LocationArea5G is any one of, a list of E-UTRA cell identifiers, or a list of Tracking Areas, or a list of civic addresses, or a geographical area, or a combination of any of these message.

In an embodiment according to the third and seventh aspects, the field Event ID of the first event notification message is translated or mapped to a field Event of the second notification message, wherein the field Event comprises a parameter or an enumerated value relating to an NIDD event, for example NIDDAuthorizationUpdate.

In an embodiment according to the third aspect, the first notification message is a Nnef_NIDD_DeliveryNotify message.

In an embodiment according to the fourth and eighth aspects, event information comprises at least one of the translated fields Matched Target Identifier, NUMBER_OF_UES_IN_AN_AREA and NUMBER_OF_USER_EQUIPMENTS.

In an embodiment according to the fourth and eighth aspects, the field Matched Target Identifier comprises a parameter or enumerated value locationArea5G.

In an embodiment according to the fourth and eighth aspects, the converting comprises providing the value comprised in the translated fields.

In an embodiment according to the fourth and eighth aspects, the value comprised in the translated field NUMBER_OF_UES_IN_AN_AREA is number of UEs present in a specified 5G Location Area.

In an embodiment according to the fourth and eighth aspects, the event notification message is received as a binary stream of X2 Protocol Data Units.

In an embodiment according to the fifth aspect, the LITaskObject comprises a parameter or enumerated value of Event Report Information.

In an embodiment according to the fifth aspect, receiving the first request message comprises receiving at a Lawful Interception Control Function (LICF).

In an embodiment according to the fifth aspect, the first request message is received via the Lawful Interception Handover Interface 1 (LI_HI1) interface.

In an embodiment according to the fifth aspect, the second request message is a Nnef_NIDDConfiguration_Create Request message and the first and second request messages comprise a RequestedData field for a NIDD event and one or more parameters or one or more enumerated values of the Event Report Information field.

In an embodiment according to the fifth aspect, the subscribe response message is received via the LI_X1 interface.

In an embodiment according to the seventh aspect, further comprises receiving from the core network node, an event notification message notifying an occurrence of the event, wherein the event notification message is Namf_EventExposure_Notify Response.

In an embodiment according to the eighth aspect, the converted event information is sent to the LEMF via the LI_HI2 interface.

According to some embodiments presented herein, the advantages may be, but not limited to, the following. The present invention can be used in a Virtual Network Function, VNF, environment or native cloud architecture of 5G to enable the NEF device to be configured and on-boarded automatically for the non-LI purposes other than LI. The present invention enables exposing one or more NEF devices to within and outside (e.g. third-party application)

the 5G core network for monitoring one or more events (e.g. some of people in a geographic area in view of a pandemic such as Covid-19). Some other advantages include enabling higher security for the public.

BRIEF DESCRIPTION OF THE DRAWINGS

For a better understanding of the disclosure, and to show more readily how it may be carried into effect, reference will now be made, by way of example, to the following drawings, in which:

FIG. 6 illustrates a flow chart of a method performed by the LI ADMF device according to one or more embodiments.

FIG. 7 illustrates a flow chart of a method performed by the NEF device according to one or more embodiments.

FIG. 8 illustrates a flow chart of a method performed by the NEF device according to one or more embodiments.

FIG. 9 illustrates a flow chart of a method performed by the MDF2 device according to one or more embodiments.

FIG. 10 illustrates different units comprised in the LI ADMF device according to one or more embodiments.

FIG. 11 illustrates different units comprised in the NEF device according to one or more embodiments.

FIG. 12 illustrates different units comprised in the NEF device according to one or more embodiments.

FIG. 13 illustrates different units comprised in the MDF2 device according to one or more embodiments.

FIG. 14 illustrates the LI ADMF device according to one or more embodiments.

FIG. 15 illustrates the NEF device according to one or more embodiments.

FIG. 16 illustrates the MDF2 device according to one or more embodiments.

DETAILED DESCRIPTION

Figure 1:
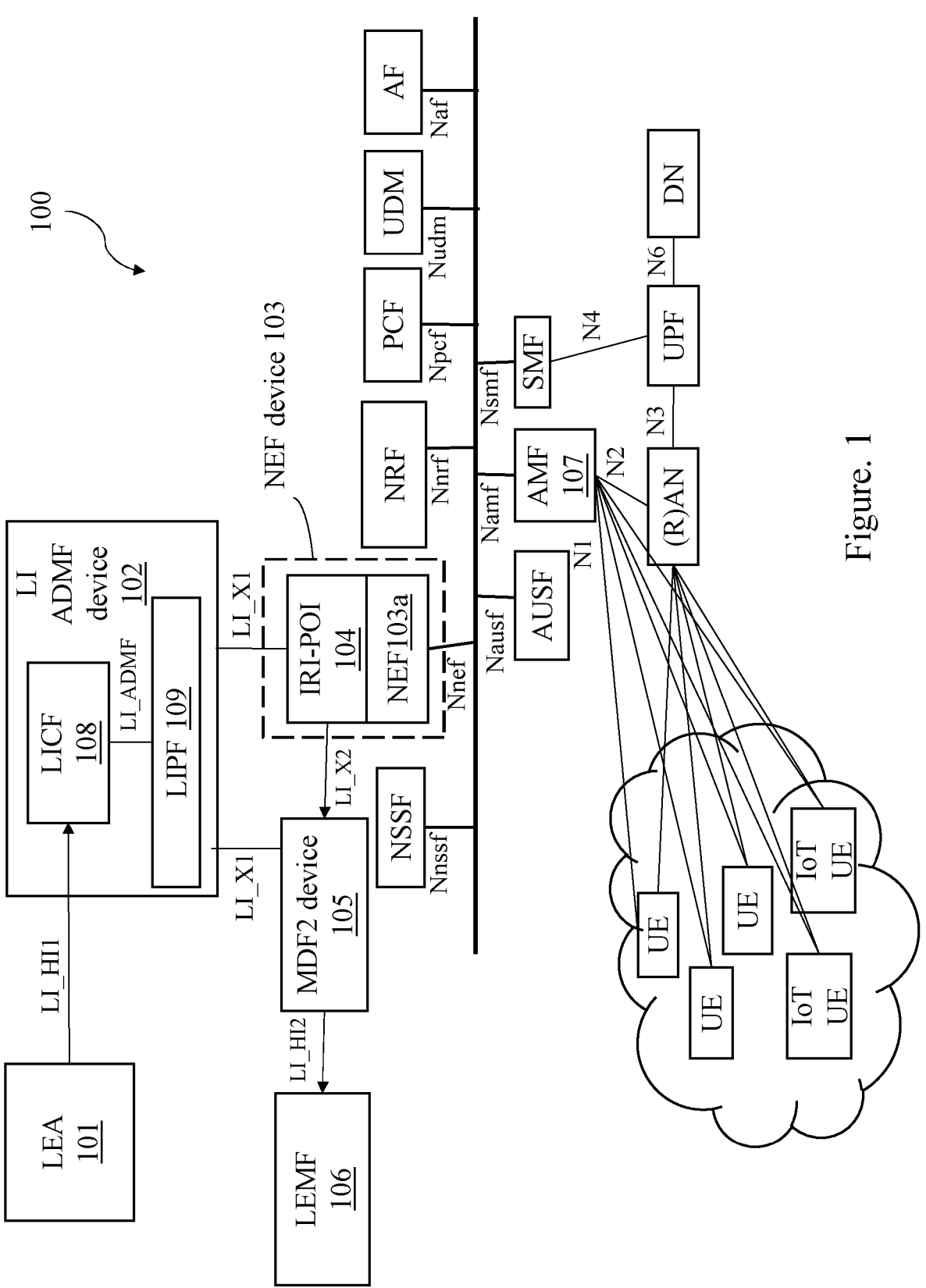
FIG. 1 illustrates an architecture diagram of an LI system used in a 5G network.

FIG. 1 illustrates an architecture diagram of an LI system used in a telecommunication network 100, here in the form of a 5G network. The LI system comprises the LI components such as an LEA 101, an LI ADMF device 102, an LEMF 106, an MDF2 device 105, a NEF device 103 comprising a NEF 103a and IRI-POI 104. The LI system, additionally comprises interfaces such as LI_HI1, LI_HI2, LI_X1 and LI_X2. The NEF 103a provides monitoring capability of an event for a UE in the 5G network and exposes such monitoring event information via the NEF. In a 5G Service-Based Architecture (SBA) core, the NEF also provides small data delivery service like the Non-IP Data Delivery (NIDD) service of 4G Service Capability Exposure Function (SCEF) for low power Internet of Things (IoT) devices to be able to communicate with the 5G network. A LEA 101 is responsible for submitting a warrant for lawful interception to a communications service provider (CSP). An LI ADMF device 102, which is responsible for the overall management of the LI functionality, includes the two logical functions: an LI control function (LICF) 108 and an LI provisioning function (LIPF) 109. The LICF 108 controls the management of the end-to-end life cycle of a warrant.

The role of the LIPF 109 varies depending on implementation of network functions and of the LI ADMF device 102 itself (e.g. virtual or non-virtual). In its simplest form, the LIPF 109 is the secure proxy used by the LICF 108 to communicate with POIs, MDFs, e.g. the IRI-POI 104, the MDF2 device 105 or other infrastructure required to operate LI within the telecommunication network 100. The IRI-POI 104 detects a target communication (i.e communication involving a device associated with a target identity for which LI has been approved), derives the intercept related information (IRI) from the target communication and delivers the POI output as X2 Intercept Related Information (xIRI) to the MDF2 device 105.

The IRI-POI 104 may be embedded within a network function (NF), for example the NEF device 103 or separate from an NF with which it is associated. The NEF 103*a* function performs the functionalities of network exposure and is implemented in the NEF device 103. The MDF2 device 105 delivers the Interception Product to the LEMF 106. The MDF2 device 105 generates the IRI messages from the xIRI and sends them to one or more LEMFs, e.g. the LEMF 106. Lawful interception handover interface (LI_HI1) is used to send warrants and other interception request information from the LEA 101 to the CSP that provides the telecommunication network 100. LI_X1 interfaces are used to manage the POIs, e.g. the IRI-POI 104, and triggering functions, and to provision LI target information on the POIs and TFs to intercept target communications. The LI_X2 interface is used to pass the xIRI message from the IRI-POIs, e.g. the IRI-POI 104, to the MDF2 device 105. The LI_HI2 interface is used to send IRI from the MDF2 device 105 to the LEMF 106. This interface is defined in e.g. 3GPP TS 33.128 V16.4.0. The NEF 103 interacts with 5G core network nodes such as Network Function Repository Function (NRF) via the Nnrf interface, Policy Control Function (PCF) via the Npcf interface, Unified Data Management (UDM) via the Nudm interface, Application Function (AF) via the Naf interface, Network Slice Selection Function (NSSF) via the Nnssf interface, Authentication Server Function (AUSF) via the Nausf interface, Access and Mobility Management Function (AMF) via the Namf interface and Session Management Function (SMF) via the Nsmf interface. The interaction with the core network nodes may, for example, be in relation to subscription to a notification of an event (e.g. Monitoring event, NIDD event). The 5G core network nodes are further connected to the 5G Radio Access Network (RAN). For instance, the AMF 107 is connected to an Access Network (AN), here in the form of a 5G Radio AN, via the N2 interface. The SMF is connected to a User Plane Function (UPF) via the N4 interface. The UPF is further connected to the AN via the N3 interface and to a Data Network (DN) via the N6 interface. End-user devices, here illustrated as UE and IoT UE, are connected to the 5G RAN and the AMF.

Figure 2:
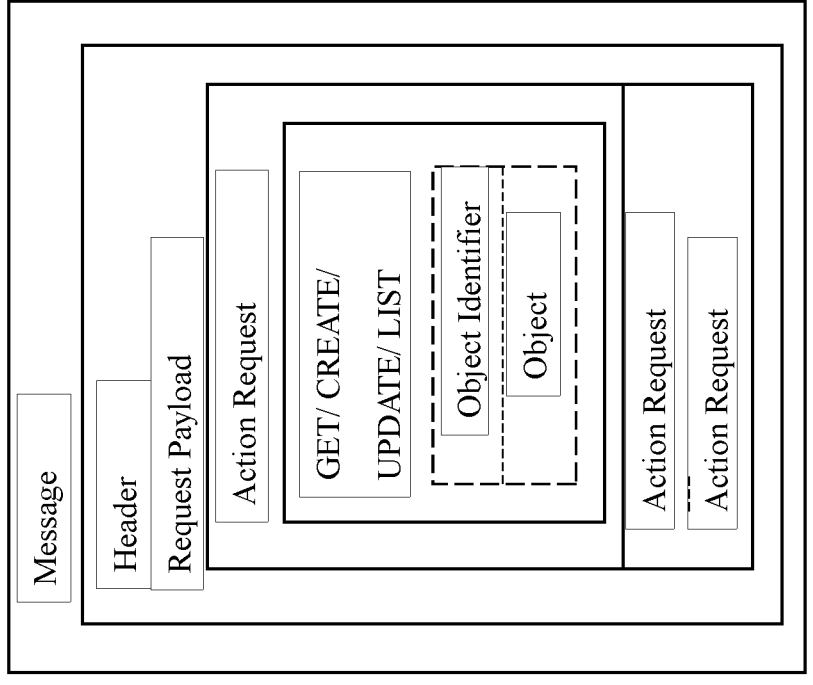
FIG. 2 illustrates an example request message structure

A request message may, for example, have a structure as shown in FIG. 2. The structure as in FIG. 2 applies to any request message, for example, a first request message, described in the present text. According to FIG. 2, a Message is a Top-level container for one or more HI1 messages. A Header contains routing and timestamp information. A Request Payload includes one or more Action Requests. Each Action has a verb such as GET, CREATE, UPDATE or LIST, in the form of a request (also called Action Request). An action (or the Verb or the Action Request) includes an Object Identifier, which identifies the Object being acted on.

Depending on the verb, it may also contain an Object. An object may, for example, be a Task Object. A Task Object may, for example, be an LITaskObject. There may be many Action Requests in a Request message. Each Action Request will, generally, act on a separate message.

The first request message may be encoded in, for example, Extensible Markup Language (XML) format according to the Warrant Information (WI) XML Schema Definition (XSD) Schema. Further, the first request message may be sent, for example, in the form of a HTTP POST message. The body of the HTTP POST message may contain a first request message.

In the absence of a HTTP transport mechanism in a particular country, a nationally-defined transport mechanism may be used for that country. The content-type of the first request message may, for example, be either text or XML. In an embodiment, caching may not be used in the HTTP configuration.

In some embodiments, a response message, a subscribe response message or an event notification message over the interfaces LI_HI1, LI_X1 or LI_X2 may have a similar message structure as the request message of FIG. 2, wherein the message structure shall be a response message structure.

Figure 3:
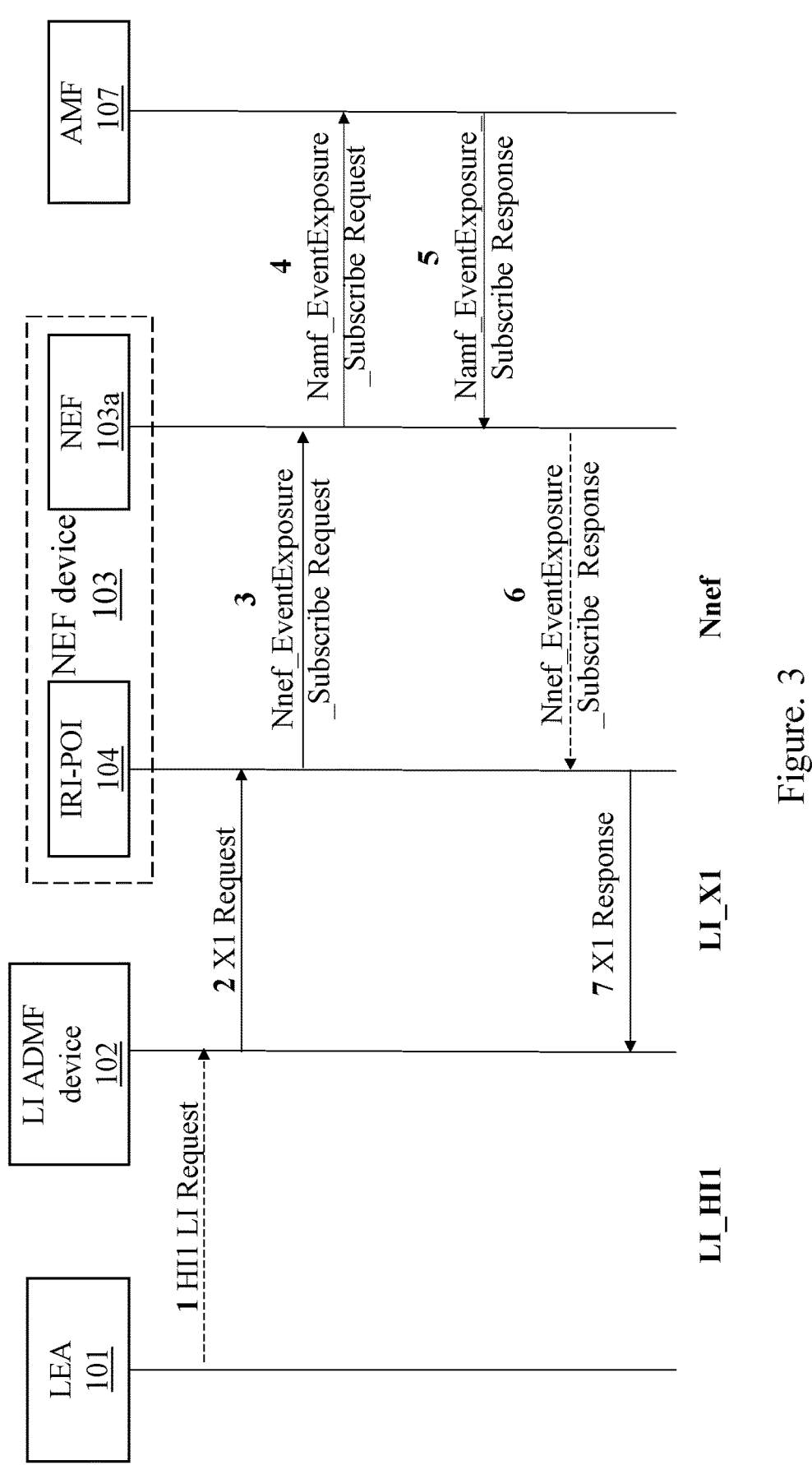
FIG. 3 illustrates the message flow for subscribing to an event between various entities according to one or more embodiments.

As illustrated in FIG. 3, the LEA 101 sends a first request message to the LI ADMF device 102 over the LI_HI interface. In an embodiment, as illustrated by arrow 1 HI1 LI Request of FIG. 3, the first request message is an HI1 LI Request message.

The first request message is sent to the LI ADMF device 102 for enabling the LI ADMF device 102 to subscribe to a notification of an event. An event may, for example, be a specific event in a 3GPP system which is reported via the NEF device 103 such as any one of the NEF devices 103, 103*b*, 103*c* illustrated in FIG. 3, FIG. 11 and FIG. 12 respectively. In an embodiment, an event may, for example, be a monitoring event or an exposure management monitoring event, such as Number of UEs present in a (specific/determined) geographical area. Table 1 describes a list of events (or a list monitoring events) and their detection criteria.

TABLE 1

List of events and their detection criteria

| Event | Detection criteria | Which NF detects the event |
|---|---|---|
| Loss of Connectivity | Network detects that the User Equipment (UE) is no longer reachable for either signalling or user plane communication. The AF may provide a Maximum Detection Time, which indicates the maximum period of time without any communication with the UE after which | AMF |

TABLE 1-continued

| | List of events and their detection criteria | |
|---|---|---|
| Event | Detection criteria | Which NF detects the event |
| | the AF is to be informed that the UE is considered to be unreachable. | |
| UE reachability | Detected when the UE transitions to CM-CONNECTED state or when the UE will become reachable for paging, e.g., Periodic Registration Update timer. It indicates when the UE becomes reachable for sending downlink data to the UE. The AF may provide the following parameters: 1) Maximum Latency; 2) Maximum Response Time; 3) Suggested number of downlink packets. | AMF, UDM |
| Location Reporting | This event is detected based on the Event Reporting Information Parameters that were received in the Monitoring Request (one-time reporting, maximum number of reports, maximum duration of reporting, periodicity, etc.). It indicates either the Current Location or the Last Known Location of a UE. When AMF is the detecting NF: One-time and Continuous Location Reporting are supported for the Current Location. For Continuous Location Reporting the serving node(s) sends a notification every time it becomes aware of a location change, with the granularity depending on the accepted accuracy of location. For Last Known Location only One-time Reporting is supported When GMLC is the detecting NF: Immediate and Deferred Location Reporting is supported. For Deferred Location Reporting the event types UE availability, Area, Periodic Location and Motion are supported. | AMF, GMLC |
| Change of SUPI-PEI association | This event is detected when the association between PEI and subscription (SUPI) changes (USIM change). | UDM |
| Roaming status | This event is detected when the UE's current roaming status (the serving PLMN and/or whether the UE is in its HPLMN) and notification when that status changes. | UDM |
| Communication failure | This event is detected when RAN or NAS level failure is detected based on connection release and it identifies RAN/NAS release code. | AMF |
| Availability after Downlink Data Notification failure | This event is detected when the UE becomes reachable again after downlink data delivery failure. | AMF |
| PDU Session Status | This event is detected when PDU session is established or released. | SMF |
| CN Type change | The event is detected when the UE moves between EPC and 5GC. It indicates the current CN type for a UE or a group of UEs when detecting that the UE switches between being served by a MME and an AMF or when accepting the event subscription. | UDM |
| Downlink data delivery status | It indicates the downlink data delivery status in the core network. Events are reported at the first occurrence of packets being buffered, transmitted or discarded, including: Downlink data in extended buffering, including: First data packet buffered event Estimated buffering time First downlink data transmitted event First downlink data discarded event | SMF |
| UE reachability for SMS delivery | This event is detected when an SMSF is registered for a UE and the UE is reachable as determined by the AMF and | UDM |

TABLE 1-continued

| List of events and their detection criteria | | |
|---|---|---|
| Event | Detection criteria | Which NF detects the event |
| | the UDM. This enables the UE to receive an SMS. | |
| Number of UEs present in a geographical area | This event is detected based on the Event Reporting Information Parameters that were received in the Monitoring Request (Level of aggregation, Sampling ratio, number of UEs that are in the geographic area described by the AF. The AF may ask for the UEs that the system knows by its normal operation to be within the area (Last Known Location) or the AF may request the system to also actively look for the UEs within the area (Current Location). | AMF |

In an embodiment for NIDD, the event(s) or monitoring event(s) may, instead, be one or more of the following NIDD events: SMF originated connection request, NIDD Authorization Update, SMF originated disconnection request, NEF originated disconnection request, and Start of interception with connected UE.

In an embodiment, the first request message may comprise a technical request to perform an LI. The technical request may still further comprise at least one of the fields: a communication address or a technical identifier used to identify a target of a task, type of monitoring event and mode of monitoring event. The target of a task may, for example, be a UE, an IoT device, or an end-user device. In an embodiment, the communication address field or the technical identifier field is TargetIdentifier. Further, the type of monitoring event field is MonitoringType. Still further, the mode of monitoring event field is MonitoringMode.

In an embodiment, a technical request is an LITaskObject. An LITaskObject represents the state of an LI Task i.e. the act of intercepting a communication. In other words, an LITaskObject represents a technical request to perform LI. In an embodiment, the LITaskObject comprises one or more fields: MonitoringType, MonitoringMode and TargetIdentifier. The field may comprise information in relation to an event of Table 1. For example, the field MonitoringType comprising a parameter (also referred to as enumeration value) NUMBER_OF_UES_IN_AN_AREA relates to the event Number of UEs present in a geographical area of Table 1. Table 2 describes a list of fields comprised in the LITask Object or the LITaskObject. It may be noted that, according to Table 2 and an embodiment, the new fields Monitoring-Type and MonitoringMode and the new parameter locationArea5G for the field TargetIdentifier have been newly added, in addition to those described in ETSI TS 103 221-1 V1.8.1 (2021-04). A task, as in Table 2, corresponds to an LITaskObject, which represents a technical request to perform LI.

TABLE 2

| List of fields comprised in the LITaskObject | |
|---|---|
| Field | Description |
| Reference | Lawful Interception Identifier (LIID) assigned to the product of task. |
| Status | The current status of the task as determined by the Receiver. |
| DesiredStatus | The current status of the task as specified by the Sender. |
| TimeSpan | It indicates the period for which task should occur, as well as provisioning and deprovisioning times. |
| DeliveryType | It indicates whether the interception should contain IRI, Content of Communication (CC) or both. |
| DeliveryDetails | Destination(s) for the intercepted LI traffic. |
| CSPID | Describes the CSP required to implement the Task. |
| HandlingProfile | A dictionary entry which gives the name of a handling profile that represents a set of configuration information associated with this task. |
| InvalidReason | Optional information for the Receiver to indicate why the Object is in the Invalid state. Usage for national agreement. |
| Flags | A set of flags associated with the Task Object. |
| MonitoringType | NUMBER_OF_UES_IN_AN_AREA The LEA 101 sends a request in order to receive a notification of the number of UEs in a given geographic area. |
| TargetIdentifier | locationArea5G It can be either a list of Evolved Universal Terrestrial Radio Access, E-UTRA, cell identifiers, or a list of New Radio, NR, cell identifiers, or a list of Tracking Areas, or a list of civic addresses, or a geographical area, or a combination of any of the above. |
| MonitoringMode | Mode of monitoring - e.g. monitoring up to a maximum number of reports, periodic monitoring along with periodicity (e.g., daily), monitoring up to a maximum duration. |

According to Table 2, an example for the Receiver may be the LI ADMF device 102. The Status field of Table 2 gives the status of the LITaskObject as determined by the Receiver. Some Status values can, for instance, be:

AwaitingProvisioning—The task is approved, but is not yet provisioned in the LI system Active—The task is active and can produce LI traffic Rejected—The task has been explicitly denied or rejected by one or more relevant authorities Suspended—The task has been suspended temporarily Cancelled—The task has been permanently cancelled Expired—The expiry date for a task has passed, meaning that the task has lapsed Error—The task is not active due to a problem with the underlying LI system Invalid—The task is not active due to a problem with the current information populated in the task Object Table 3 describes a list of parameters (or enumeration values) for the MonitoringType field.

The field TargetIdentifier, instead, includes a communication address or a technical identifier used to identify a target of task.

It may be noted that in some embodiments, a parameter comprises an enumeration value. In some other embodiments, the parameter does not comprise an enumeration value and instead, both the parameter and the enumeration refer to the same value comprised in a field of a message.

The first request message is sent over the LI_HI1 interface. In an embodiment, the LI_HI1 interface is adapted to send the first request message comprising at least the fields MonitoringType, MonitoringMode and TargetIdentifier, in the LITaskObject.

The LICF, present in the LI ADMF device 102, receives the first request message (or warrant) from the LEA 101, derives the intercept information from the first request message (or warrant) and provides it to the LIPF. The

TABLE 3

| List of parameters for Monitoring Type Field | | |
| --- | --- | --- |
| Parameter or Enumeration value | Description | Applicability |
| LOSS_OF_CONNECTIVITY | The LEA 101 requests to be notified when the 3GPP network detects that the UE is no longer reachable for signalling or user plane communication. | Loss_of_connectivity_ notification |
| UE_REACHABILITY | The LEA 101 requests to be notified when the UE becomes reachable for sending either SMS or downlink data to the UE. | Ue-reachability_notification |
| LOCATION_REPORTING | The LEA 101 requests to be notified of the current location or the last known location of the UE. | Location_notification |
| CHANGE_OF_SUPI_PEI_ASSOCIATION | The LEA 101 requests to be notified when the association of a PEI that uses a specific subscription SUPI is changed. | Change_of_SUPI_PEI_association_notification |
| ROAMING_STATUS | The LEA 101 requests the UE's current roaming status and requests to get notified when the status changes. | Roaming_status_notification |
| COMMUNICATION_FAILURE | The LEA 101 requests to be notified of communication failure events. | Communication_failure_notification |
| AVAILABILITY_AFTER_DDN_FAILURE | The LEA 101 requests to be notified when the UE has become available after a DDN failure. | Availability_after_DDN_failure_notification, Availability_after_DDN_failure_notification_enhancement |
| PDN_CONNECTIVITY_STATUS | The LEA 101 requests to be notified when the 3GPP network detects that the UE's PDN connection is set up or torn down. | Pdn_connectivity_status |
| DOWNLINK_DATA_DELIVERY_STATUS | The LEA device requests to be notified when the 3GPP network detects that the downlink data delivery status is changed. | Downlink_data_delivery_status_5G |
| NUMBER_OF_UES_IN_AN_AREA | The LEA 101 requests to be notified the number of UEs in a given geographic area. | Number_of_UEs_in_an_area_notification, Number_of_UEs_in_an_area_notification_5G |

In an embodiment for NIDD, the LITaskObject of Table 2 comprised in the X1 Request message comprises a field RequestedData further comprising a parameter (or enumerated value) NIDD, instead of the field MonitoringType. The field MonitoringMode of Table 2 and its parameter or enumeration value is still comprised in this embodiment. The field TargetIdentifier is still comprised but it does not include the parameter or enumeration value locationArea5G.

intercept information may be derived from the fields comprised in the first request message, wherein the fields are at least the MonitoringType, MonitoringMode and TargetIdentifier fields. The LIPF present in the LI ADMF device 102 provisions, in the NEF device 103 such as any one of the NEF devices 103, 103b, 103c, the IRI-POI 104. The IRI-POI 104 may be a Directly Provisioned IRI-POI, i.e. the IRI-POI 104 detect a target's communication that need to be intercepted, and then derives the intercept related information from that target communication. In an embodiment, the IRI-POI 104 may be provisioned as a Triggered IRI-POI, i.e. the IRI-POI 104 detects the target communications based on the trigger received from an associated Triggering Control Function (TCF) and then derives the intercept related information of target communications.

As illustrated by arrow 2 X1 Request of FIG. 3, the LI ADMF device 102 sends a second request message to an IRI-POI 104. The IRI-POI 104 may be provisioned either in or externally to the NEF device 103 or the NEF device 103*b*.

In an embodiment as illustrated by the arrow 2 X1 Request of FIG. 3, the second request message is an X1 Request message. The second request message or the X1 request message may comprise fields, for example, as described in Table 4.

TABLE 4

| Fields comprised in the Second Request message | |
|---|---|
| Field | Description |
| LI ADMF Identifier | Identifies the LI ADMF device 102 uniquely to the NE. Required to match the details provided by a certificate of the LI ADMF, such as an X.509 certificate. |
| NE Identifier | Uniquely identifies the NE to the LI ADMF device. Required to match the details provided by the NE's certificate, such as an X.509 certificate for the NE. |
| MessageTimestamp | Timestamp indicating the time the message was sent by the requester. |
| Version | Version of a ETSI standard specification document with which encoding of the message is in compliance. |
| X1TransactionID | Used to correlate Request and Response. |

In addition to the fields described in Table 4, the second request message or the X1 Request message or the X1 message may further comprise a message definition, such as, ActivateTask which is used by the LI ADMF device 102 to add a new task to the NEF device 103 or the NEF device 103*b*. The message definition indicates a type of request being made and contains a request parameter (also called field) particular to the type of request. The ActivateTask or ActivateTaskRequest message definition contains a structure as in Table 5.

TABLE 5

| ActivateTask message definition structure | |
|---|---|
| Field | Description |
| TaskDetails | Target and interception details. |

The TaskDetails field comprises fields as described in Table 6. The TaskDetails may, in addition to the fields of Table 6, comprise one or more of the following fields: X1 Identifier (XID), DeliveryType, ListOfDestinationIdentifiers (ListOfDIDs), ListOfMediationDetails, CorrelationID, ImplicitDeactivationAllowed, ProductID and TaskDetailsExtensions. It is to be noted that the fields and their enumeration values (or parameters) relating to the first request message fields i.e. MonitoringType, MonitoringMode and TargetIdentifier, are further included in the TaskDetails field of the second request message.

TABLE 6

| Fields comprised in TaskDetails | |
|---|---|
| Field | Parameter/Description |
| MonitoringType | NUMBER_OF_UES_IN_AN_AREA<br>Applicable for DeliveryType= "X2Only"<br>Either based on 'last known location' or 'current location'. |
| TargetIdentifier | locationArea5G<br>It can be either a list of E-UTRA cell IDs, or a list of NR cell ID, or a list of Tracking Areas, or civic addresses, or a geographic area, or a combination of any of the above. |
| MonitoringMode | Daily |

Referring to Table 6, the field MonitoringType comprises a parameter or an enumeration value NUMBER_OF_UE-S_IN_AN_AREA, indicates number of user equipment in a geographical area. The field TargetIdentitfier comprising a parameter or an enumeration value locationArea5G indicates either a list of E-UTRA cell IDs, or a list of NR cell ID, or a list of Tracking Areas, or civic addresses, or a geographic area, or a combination of any of the above. The field MonitoringMode indicates monitoring up to a maximum number of reports, periodic monitoring along with periodicity (e.g., daily) or monitoring up to a maximum duration.

An example format of the second request message or the X1 Request message or the X1 message, in XML format, is shown below.

```
<RequestContainer>
<X1Request>
<LI ADMF Identifier>admin1234</LI ADMF Identifier>
<NE Identifier>NEF1</NE Identifier>
<MessageTimestamp>2020-09-
10T13:37:00.012345+02:00</MessageTimestamp>
<Version>1.7.1</Version>
<X1TransactionID>123e4567-e89b-12d3-a456-
426614174000</X1TransactionID>
<ActiveTaskRequest>
<XID>123e4567-e89b-12d3-a477-426614174000</XID>
<TargetIdentifier> carnaby street 450</TargetIdentifier>
<monitoringType>NUMBER_OF_UES_IN_AN_AREA</monitoringType>
<monitoringMode>daily</monitoringMode>
<DeliveryType>X2Only</DeliveryType>
<ListOfDIDs>192.168.165.132,192.168.165.133</ListOfDIDs>
<ListOfMediationDetails></ListOfMediationDetails>
<CorrelationID></CorrelationID>
<ImplicitDeactivationAllowed> False</ImplicitDeactivationAllowed>
<ProductID></ProductID>
<TaskDetailsExtensions>
</TaskDetailsExtensions>
</ActiveTaskRequest>
</X1Request>
</RequestContainer>
```

As illustrated by arrow 3 Nnef_EventExposure_Subscribe Request of FIG. 3, the IRI-POI 104 sends a Nnef_Event-Exposure_Subscribe Request message to the NEF 103*a* in the NEF device 103 or the NEF device 103*b*. In other words, the IRI-POI 104 receives the X1 Request message comprising one or more fields of Table 6 and translates the one or more fields into one or more fields of Nnef_EventExposure_Subscribe request message and sends the Nnef_EventExposure_Subscribe request message to the NEF 103*a*. More specifically, the IRI-POI 104 translates or maps the MonitoringType field comprised in the X1 Request message to an Event ID field of the Nnef_EventExposure_Subscribe request message. An Event ID field identifies the type of event, for example Number of UEs present in a geographical area of Table 1, being subscribed to. Additionally, the IRI-POI 104 translates or maps the MonitoringMode field comprised in the X1 Request message to a parameter of Event Reporting Information field of the Nnef_EventExposure_Subscribe request message. An example of the Event Reporting Information parameter is Event reporting mode. An event may be detected based on the Event Reporting Information parameter. Within a subscription, one or more Event IDs may be associated with a unique Event Reporting Information. Furthermore, the IRI-POI 104 translates or maps the TargetIdentifier field comprised in the X1 Request message to a Target of Event Reporting field of the Nnef_E-ventExposure_Subscribe request message. The Target of Event Reporting field may further indicate a specific UE or PDU Session, a group of UE(s) or any UE (i.e. all UEs). Within a subscription all Event IDs may be associated with the same Target of Event Reporting (possibly corresponding to multiple UE or multiple PDU Sessions). In an embodiment, the IRI-POI 104 further translates or maps the ListOf-DIDs field comprised in the X1 Request message to a Notification Target Address field of the Nnef_EventExposure_Subscribe request message. A Notification Target Address field allows the Event Receiving Network function to correlate notifications received from the Event provider with a subscription. The Nnef_EventExposure_Subscribe request message may, additionally, relate to a Nnef_Event-Exposure_Subscribe operation. Further the Nnef_EventExposure_Subscribe request message may relate to a 5G NEF service operation of the NEF device 103.

Translate or map, as mentioned in this application, may refer to a field translated or mapped to another field and/or an enumeration value of one field translated or mapped to an enumeration value of another field and/or a parameter of one field translated or mapped to a parameter of another field and/or a value of one field translated or mapped to a value of another field.

In an embodiment for Non-IP Data Delivery, NIDD, the TaskDetails of Table 6 comprises a field RequestedData comprising an enumerated value NIDD, instead of the field MonitoringType. The field MonitoringMode of Table 2 and its parameter or enumeration value is still comprised in this embodiment. The field TargetIdentifier is still comprised but it does not include the parameter or enumeration value locationArea5G. The field TargetIdentifier, instead includes a communication address or a technical identifier used to identify a target of task. An example of X1 Request in xml format for NIDD is reported below.

```
<RequestContainer>
<X1Request>
<LI ADMF Identifier>admin4321</LI ADMF Identifier>
<NE Identifier>NEF1</NE Identifier>
<MessageTimestamp>2020-11-
16T13:37:00.012345+02:00</MessageTimestamp>
<Version>1.7.1</Version>
<X1TransactionID>321e4567-e89b-12d3-a456-
426614174000</X1TransactionID>
<ActiveTaskRequest>
<XID>321e4567-e89b-12d3-a477-426614174111</XID>
<TargetIdentifiers>msisdn:918369110173</TargetIdentifiers>
<requestedData>NIDD</requestedData>
<monitoringMode>daily</monitoringMode>
<DeliveryType>X2Only</DeliveryType>
<ListOfDIDs>192.168.165.135,192.168.165.136</ListOfDIDs>
<ListOfMediationDetails></ListOfMediationDetails>
<CorrelationID></CorrelationID>
<ImplicitDeactivationAllowed>False</ImplicitDeactivationAllowed>
<ProductID></ProductID>
<TaskDetailsExtensions>
</TaskDetailsExtensions>
</ActiveTaskRequest>
</X1Request>
</RequestContainer>
```

Furthermore, in the embodiment for Non-IP Data Delivery, the IRI-POI 104 receives the X1 Request message comprising one or more fields related to NIDD as described above and translates the one or more fields into one or more fields of the Nnef_NIDDConfiguration_Create Request message and sends the Nnef_NIDDConfiguration_Create Request message to the NEF 103*a* in the NEF device 103 or the NEF device 103*b*. More specifically, the new field RequestedData of the X1 Request message will be mapped or translated to a field Event ID of the Nnef_NIDDConfiguration_Create Request message. The Event ID may comprise a parameter or an enumerated value, for example, NIDD. This mapping indicates subscription to or more NIDD events. The MonitoringMode field of the X1 Request message will be mapped or translated to the field Event Reporting Information of the Nnef_NIDDConfiguration_Create Request message. The Event Reporting Information field may comprise a parameter or an enumerated value such as Event reporting mode. The event reporting mode refers to mode of reporting mode of reporting, for example, reporting up to a maximum number of reports, periodic reporting along with periodicity, reporting up to a maximum duration. The field TargetIdentifier of the X1 Request message will be mapped or translated to the new field Target of Event Reporting of the Nnef_NIDDConfiguration_Create Request message. The Target of Event Reporting field may comprise a parameter or enumerated value such as GPSI or External Group Identifier. The already existing field ListOfDIDs of the X1 Request message will be mapped or translated to the new field Notification Target Address. In an embodiment, the XID field (i.e. Lawful Interception Identifier assigned to the product of task) of the X1 Request message will be mapped to a new field XID of Nnef_NIDDConfiguration_Create message.

As illustrated by arrow 4 Namf_EventExposure_Subscribe Request of FIG. 3, the NEF 103*a* in the NEF device 103 or the NEF device 103*b* sends a Namf_EventExposure_Subscribe Request message to the AMF, wherein the Namf_EventExposure_Subscribe Request message comprises the translated or mapped fields of Nnef_EventExposure_Subscribe Request message, as described above in reference to arrow 3. The Namf_EventExposure_Subscribe Request message is sent to the AMF 107 to subscribe to one or more events or event IDs or event notification. The NEF device 103 or the NEF device 103*b* further includes, in the Namf_EventExposure_Subscribe Request message to the AMF, a notification endpoint of the NEF device 103 or the NEF device 103*b* or the NEF 103*a*.

The AMF authorizes the subscription to the notification of one or more events or the subscription to one or more events by the NEF device 103 or the NEF device 103*b*, wherein the events may refer to one or more events of Table 1. The AMF records or stores the association of the event trigger and the identity of the requester. The identity of the requester may, for example, be an NEF ID. The association of the event trigger may, for example, be an association between the NEF ID and an event (or an XID). The AMF acknowledges the authorization by sending a Namf_EventExposure_Subscribe Response message to the NEF device 103 or the NEF device 103*b*, as illustrated by arrow 5 Namf_EventExposure_Subscribe Response of FIG. 3. It may be noted that procedures illustrated by arrows 4 and 5 are not part of the embodiment for NIDD.

The NEF 103*a* in the NEF device 103 (or the NEF device 103*b*) acknowledges the subscription to the notification of one or more events or the subscription to one or more events, by sending a subscribe response message (e.g. Nnef_EventExposure_Subscribe Response message) to the IRI-POI 104, as illustrated by arrow 6 Nnef_EventExposure_Subscribe Response of FIG. 3.

In an embodiment for NIDD, the NEF 103*a* in the NEF device 103 (or the NEF device 103*b*) acknowledges the subscription to the notification of one or more NIDD events or the subscription to one or more NIDD events, by sending a subscribe response message (eg: Nnef_NIDDConfiguration_Create Response message) to the IRI-POI 104.

As illustrated by arrow 7 X1 Response, the IRI-POI 104 sends a subscribe response message (e.g. X1 Response message) to the LI ADMF device 102, acknowledging the subscription to the notification of one or more events or the subscription to one or more events. In an embodiment for NIDD, the events are NIDD events An example X1 Response message in XML format is shown below

```
<ResponseContainer>
<X1Response>
<ActiveTaskResponse>
</OK-Acknowledged and Completed>
</<ActiveTaskResponse>
</X1Response>
</ResponseContainer>
```

The message structure for a response message is similar to that of a request message of FIG. 2.

While FIG. 3 has been exemplified with respect to a NEF Subscribe service operation, in an embodiment, the NEF Unsubscribe service operation may, additionally or alternatively, be performed as below to unsubscribe from a notification of an event. The procedure is similar to arrows 1 to 7 of FIG. 3, albeit certain changes which have been highlighted below. It is to be noted that a complete repetition of the procedure of FIG. 3 is avoided for readability purposes.

Arrow 1: A HI1 LI Deactivation request message is sent from the LEA 101 towards the LI ADMF device 102. The format of the request message is similar to the HI1 LI Request message.

Arrow 2: A DeactivateTaskRequest comprising XID is sent from the LI ADMF device 102 to the IRI-POI 104.

Arrow 3: A Nnef_EventExposure_Unsubscribe request is translated by the IRI-POI 104 in the NEF device 103 (or the NEF device 103*b*) and sent from the IRI-POI 104 to the NEF 103*a* in the NEF device 103 (or the NEF device 103*b*).

Arrow 4: A Namf_EventExposure_Unsubscribe request is sent from NEF 103*a* in the NEF device 103 (or the NEF device 103*b*) to AMF.

Arrow 5: A Namf_EventExposure_Unsubscribe Response is sent from AMF to NEF 103*a* in the NEF device 103 (or the NEF device 103*b*).

Arrow 6: A Nnef_EventExposure_Unsubscribe Response is translated by the IRI-POI 104 in the NEF device 103 (or the NEF device 103*b*) and sent from the NEF 103*a* in the NEF device 103 (or the NEF device 103*b*) to the IRI-POI 104.

Arrow 7: A DeactivateTaskResponse is sent from the IRI-POI 104 to the LI ADMF device 102.

Figure 4:
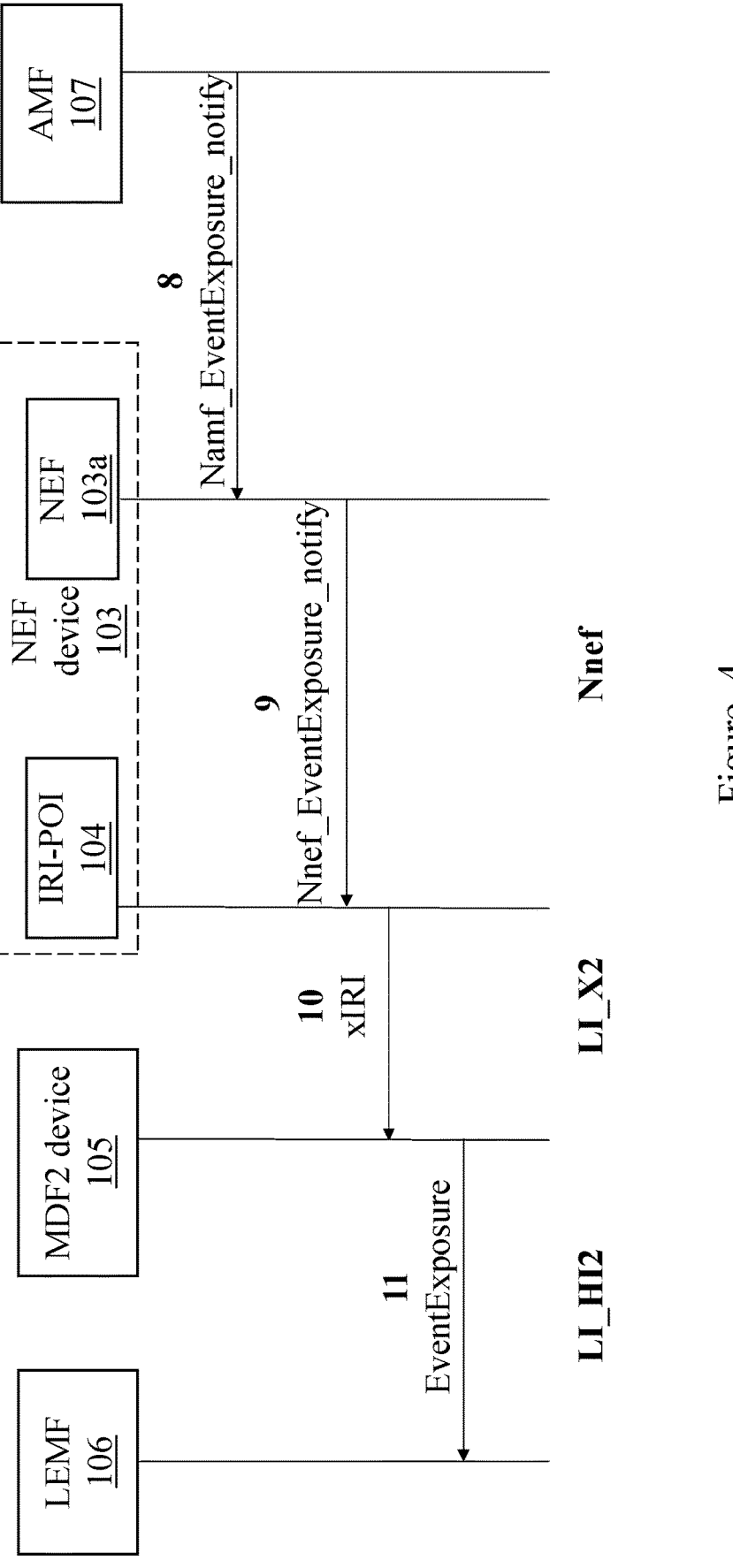
FIG. 4 illustrates the message flow for notifying an event between various entities according to one or more embodiments.

FIG. 4 illustrates a procedure for receiving a notification of events. The AMF device detects one or more events (or monitoring events) subscribed to by the NEF device 103, such as any one of the NEF devices 103, 103*c*, and sends a Namf_EventExposure_notify message comprising an event report to the NEF device 103 or the NEF device 103*c*, as illustrated by arrow 8 Namf_EventExposure_notify of FIG. 4. In other words, the AMF detects an event or a monitoring event, such as, UE access and mobility event, for example MonitoringType which relates to Number of UEs present in a geographical area event of Table 1, corresponding to a Subscription, and invokes Namf_EventExposure_Notify service operation to the NEF device 103 or the NEF device 103*c* which has subscribed to the UE access and mobility event before. The UE access and mobility event may for example be one or more of the following:

Location Report (TAI, Cell ID, N3IWF/TNGF node, UE local IP address and optionally UDP source port number)

UE moving in or out of a subscribed Area Of Interest

Number of UEs served by the AMF and located in Area Of Interest

Time zone changes (UE Time zone)

Access Type changes (3GPP access or non-3GPP access)

Registration state changes (Registered or Deregistered)

Connectivity state changes (IDLE or CONNECTED)

UE loss of communication

UE reachability status

UE indication of switching off Short Messaging Service (SMS) over NAS service

Subscription Correlation ID change (implicit subscription)

UE Type Allocation code (TAC)

Frequent mobility re-registration

Subscription Correlation ID addition (implicit subscription) and

User State Information in 5GS

The event report may comprise an event ID field, a Target of Event Reporting field and/or MonitoringType field.

It may be noted that the procedure illustrated by arrow 8 is not part of the embodiment for NIDD.

As illustrated by arrow 9 Nnef_EventExposure_notify, the NEF 103*a* in the NEF device 103 or the NEF device 103*c* sends a Nnef_EventExposure_notify message to the IRI-POI 104. The NEF 103*a* translates or maps one or more fields comprised in the Event report of the Namf_EventExposure_notify message to one or more fields of Nnef_EventExposure_notify message. The IRI-POI 104 translates or maps one or more fields comprised in the Nnef_EventExposure_notify into one or more fields of xIRI message over the LI_X2 interface. In other words, the one or more fields of the Namf_EventExposure_notify is translated or mapped to one or more fields of xIRI message over the LI_X2 interface. More specifically, the field Target of Event Reporting will be mapped into Matched Target Identifier field (comprising e.g. parameter LocationArea5G), the field Event ID into the field Event=NUMBER_OF_UES_IN_AN_AREA while the field MonitoringType (comprising e.g.: parameter Number of UEs present in a geographical area) will be mapped into field NUMBER_OF_USER_EQUIPMENTS. As illustrated by arrow 9, the IRI-POI 104 sends to the MDF2 device 105 the xIRI message over LI_X2 interface.

In an embodiment related to NIDD, the IRI-POI 104 translates or maps, instead, one or more fields comprised in Nnef_NIDD_DeliveryNotify message to one or more fields of a xIRI message, over the LI_X2 interface. In other words, the field Target of Event Reporting of the Nnef_NIDD_DeliveryNotify message is translated or mapped to a field Matched Target Identifier of the xIRI message. The field Target of Event Reporting may comprise a parameter or an enumerated value, for example, msisdn-918369110173. Further, the field Event ID of the Nnef_NIDD_DeliveryNotify message is translated or mapped to a field Event of the xIRI message. The field Event may comprise a parameter or an enumerated value relating to an NIDD event, for example NIDDAuthorizationUpdate, Furthermore, the field GPSI of the Nnef_NIDD_DeliveryNotify message is translated or mapped to GPSI of the xIRI message, the field SUPI of the Nnef_NIDD_DeliveryNotify message is translated or mapped to a field SUPI (e.g.=imsi-423456789042315) of the xIRI message, the field PEI of the Nnef_NIDD_DeliveryNotify message is translated or mapped to a field PEI (e.g.=imei-213457689012340) of the xIRI message, the field DNN of the Nnef_NIDD_DeliveryNotify message is translated or mapped to a field DNN (e.g.=fast.t-mobile-.com) of the xIRI message.

As illustrated by arrow 10 xIRI, a xIRI message comprising the translated fields, as described by the procedure of arrow 9, is sent from the IRI-POI 104 to the MDF2 device 105. When an event is received by the MDF2 device 105 from the IRI-POI 104, in case of DeliveryType comprising X2Only, and TargetIdentifier field locationArea5G, the MDF2 device 105 will provide the number of UEs in the given geographic area, so that the LEMF 106 could use this data for public safety (for example, to monitor gatherings of people for the containment of the spread of CoVID-19). The IRI-POI 104 in the NEF device 103 or the NEF device 103*c*, sends the xIRI message (or the event notification message) to the MDF2 device 105 as a binary stream of X2 Protocol Data Units (PDUs). Table 7 and Table 8 provide an example X2 PDU format.

TABLE 7

| X2 PDU Header fields | |
| --- | --- |
| Field | Description |
| Version | The POI (the IRI-POI 104) shall populate the Version field with the version of the specification (e.g. ETSI TS 103 221-2 V1.4.1 (2021 April)) used to create the PDU, given as a 16-bit unsigned integer. Length = 2 octets. |
| PDU Type | X2 PDU. Length = 2 octets. |
| Header Length | The POI (the IRI-POI 104) shall populate the Header Length field with the length of the header in octets, including the mandatory and any conditional fields that have been populated. Length = 4 octets. |
| Payload Length | The POI (the IRI-POI 104) shall populate the Payload Length field with the length of the Payload field in octets. Length = 4 octets. |
| Payload Format | The POI (the IRI-POI 104) shall indicate the format and encoding of the Payload field by setting the Payload Format field to the appropriate value. A list of valid values, and their definitions, is given in clause 5.4 of ETSI TS 103 221-2 V1.4.1 (2021 April). Length = 2 octets. |

TABLE 7-continued

| X2 PDU Header fields | |
|---|---|
| Field | Description |
| Payload Direction | Indicates the direction of intercepted event contained in the PDU. Length = 2 octets. |
| XID | The POI (the IRI-POI 104) shall populate the XID field with the XID associated with the intercepted product, as assigned by the relevant X1 interface. Length = 16 octets. |
| Correlation ID | The POI (the IRI-POI 104) shall ensure that the PDUs associated with the same communication session are provided the same Correlation ID value. Length = 8 octets. |
| Conditional Attribute fields | Indicates a number of conditional attributes defined by a type-length-value structure. Length = variable. |
| Payload | The POI (the IRI-POI 104) shall populate the payload field with intercepted event or data. Length = variable. |

TABLE 8

| X2 PDU Conditional Attribute fields | |
|---|---|
| Field | Description |
| NFID | Network Function ID as received by the NEF device 103 or the NEF device 103c |
| Timestamp | If used, the POI shall populate the Timestamp field with the time that the content for the PDU was intercepted. |
| Matched Target Identifier | locationArea5G It can be either a list of E-UTRA cell IDs, or a list of NR cell ID, or a list of Tracking Areas, or civic addresses, or a geographic area, or a combination of any of the above. |

The IRI-POI 104 populates the Payload field with the intercepted data or the intercepted event, given in the format specified by the Payload Format field of Table 7. The intercepted event, for example, the Monitored Event Number of UEs in a Location Area (or Number of UEs present in a geographical area or Number of UEs in an area) that is included in the payload shall report the number of UEs present in the specified 5G Location Area. An example of X2 PDU in xml format is provided below.

In an embodiment for NIDD, when an event is received at the MDF2 device 105 from the IRI-POI 104, in case of DeliveryType="X2Only", and TargetIdentifier="specific GPSI or External Group Identifier", then the MDF2 device 105 will provide a notification of one or more Non-IP Data Delivery (NIDD) events, including NIDD events such as: SMF originated connection request, NIDD Authorization Update, SMF originated disconnection request, NEF originated disconnection request, Start of interception with connected UE, so that the LEMF 106 could use this data for public safety. The IRI-POI 104 in the NEF device 103 or the NEF device 103c, sends the intercepted event to the MDF2 device 105 as a binary stream of X2 Protocol Data Units (PDUs). Each X2 PDU is formatted similar Table 7 and Table 8 with the following changes: The payload field of Table 7 is populated with one or more intercepted NIDD events. The Matched Target identifier field includes a communication address or a technical identifier instead of the parameter or enumeration value locationArea5G. An example of X2 PDU in XML format for a NIDD event is provided below.

```
<PDU>
<Version> current version<Version>
<PDUType>2</PDUType>
<HeaderLenght>variable</HeaderLenght>
<PayloadLength>variable</PayloadLength>
<PayloadFormat>4</PayloadFormat>
<PayloadDirection>1<PayloadDirection>
<XID>123e4567-e89b-12d3-a477-426614174000</XID>
<CorrelationId><CorrelationId>
<ConditionalAttribute>
    <NFID></NFID>
    <Timestamp>2020-09-10T13:37:00.012345+02:00</Timestamp>
    <Matched Target Identifier> carnaby street 450</Matched Target Identifier>
</ConditionalAttribute>
<Payload>
  <EventContent>
     <Event>NUMBER_OF_UES_IN_AN_AREA</Event>
     <NUMBER_OF_USER_EQUIPMENTS>1000</NUMBER_OF_USER_EQUIPMENTS>
  </EventContent>
</Payload>
</PDU>
```

```
<PDU>
<Version> current version<Version>
<PDUType>2</PDUType>
<HeaderLenght>variable</HeaderLenght>
<PayloadLength>variable</PayloadLength>
<PayloadFormat>4</PayloadFormat>
<PayloadDirection>1<PayloadDirection>
<XID>321e4567-e89b-12d3-a477-426614174111</XID>
<CorrelationId><CorrelationId>
<ConditionalAttribute>
   <NFID>NEF01</NFID>
      <Timestamp>2020-11-16T13:37:00.012345+02:00</Timestamp>
      <Matched Target Identifier>msisdn-918369110173</Matched Target Identifier>
</ConditionalAttribute>
<Payload>
  <EventContent>
      <Event>NIDDAuthorizationUpdate </Event>
      <gpsi> msisdn-918369110173</gpsi>
      <supi> imsi-423456789042315</supi>
      <pei> imei-213457689012340</pei>
      <s-nssai> </s-nssai>
      <dnn>fast.t-mobile.com </dnn>
      <pdusessionid> </pdusessionid>
  </EventContent>
</Payload>
</PDU>
```

The following describes the operations in relation to different NIDD events.

1. SMF originated connection request—When a Connectivity Request is received by the NEF device 103 or the NEF device 103c, an SMF originated connection request event is generated by the NEF device 103 or the NEF device 103c. The following fields (if available) comprised in the xIRI message over LI_X2 interface will be sent to the MDF2 device 105:

NIDD information (Information such as Generic Public Subscription Identifier (GPSI) and AF ID used for SMF-NEF Connection)

Subscription Permanent Identifier (SUPI)

Permanent Equipment Identifier (PEI)

Single-Network Slice Selection Assistance Information (S-NSSAI)

Data Network Name (DNN).

In 5G, Data Networks are specifically identified using a DNN. The DNN is typically in the form of an APN (Access Point Name).

Event Type (SMF originated connection request)

Event Date and Time (It indicates the date (year/month/day) and time (hour/minute/second), in local time, of the target identity active event)

Network Element Identifier (NEF ID, Unique identifier for the NEF reporting the event)

PDU session ID (Identifier of the PDU Session)

2. NIDD Authorization Update

A UDM may initiate the NIDD Authorization Update procedure with the NEF device 103 or the NEF device 103c to send updated Authorization information to the NEF device 103 or the NEF device 103c. When a NIDD Authorization Update is sent to the NEF device 103 or the NEF device 103c, a NIDD Authorization Update event is generated by the NEF device 103 or the NEF device 103c. The following fields (if available) comprised in the xIRI message over LI_X2 interface will be sent to the MDF2 device 105:

GPSI

SUPI

PEI

S-NSSAI

DNN Event Type (NIDD Authorization Update)

Event Date and Time (It indicates the date (year/month/day) and time (hour/minute/second), in local time, of the target identity active event)

Network Element Identifier (NEF ID, Unique identifier for the NEF reporting the event)

PDU session ID

3. SMF originated disconnection request

When a Disconnection Request, sent by SMF, is received by the NEF device 103 or the NEF device 103c a SMF originated disconnection request event is generated by the NEF device 103 or the NEF device 103c. The following fields (if available) comprised in the xIRI message over LI_X2 interface will be sent to the MDF2 device 105:

GPSI

SUPI

PEI

S-NSSAI

DNN

Event Type (SMF originated disconnection request)

Event Date and Time (It indicates the date (year/month/day) and time (hour/minute/second), in local time, of the target identity active event)

Network Element Identifier (NEF ID, Unique identifier for the NEF reporting the event)

PDU session ID

4. NEF originated disconnection request

When a Disconnection Request is sent by the NEF device 103 or the NEF device 103c a NEF originated disconnection request event is generated by the NEF device 103 or the NEF device 103c. The following fields (if available) comprised in the xIRI message over LI_X2 interface will be sent to the MDF2 device 105: GPSI

SUPI

PEI

S-NSSAI

DNN

Event Type (NEF originated disconnection request)

Event Date and Time (It indicates the date (year/ month/day) and time (hour/minute/second), in local time, of the target identity active event)

Network Element Identifier (NEF ID, Unique identifier for the NEF reporting the event)

PDU session ID

5. Start of interception with connected UE

This event will be generated when interception for a target is started and if the target is already connected. If there are multiple PDN connections active for the target, then for each of them an event report is generated. The following fields (if available) comprised in the xIRI message over LI_X2 interface will be sent to the MDF2 device 105:

GPSI

SUPI

PEI

S-NSSAI

DNN

Event Type (Start of interception with Connected UE)

Event Date and Time (It indicates the date (year/ month/day) and time (hour/minute/second), in local time, of the target identity active event)

Network Element Identifier (NEF ID, Unique identifier for the NEF reporting the event)

Location Information

As illustrated by arrow 11 EventExposure, the MDF2 device 105 converts the intercepted traffic (or intercepted event) into a standard format of a EventExposure message (or an event notification message) and sends the Event Number of UEs in Location Area (or Number of UEs present in a geographical area or Number of UEs in an area), via the LI_HI2 interface, to a collection function running at the LEMF 106. The standard format of the EventExposure message (or an event notification message) message sent over LI_HI2 is structured as a header and a payload. The header contains general information like LIID, timestamp, correlation information. The payload contains intercepted information (or intercepted event) that the MDF2 device 105 has earlier received, such as those received from the IRI-POI 104. Messages defined as passing over the LI_HI2 interface, may for example, be passed as the payload of the three GPP33128 Defined IRI field. The LEMF 106 provides collection, storage and analysis of the intercepted traffic (or intercepted event).

Figure 5:
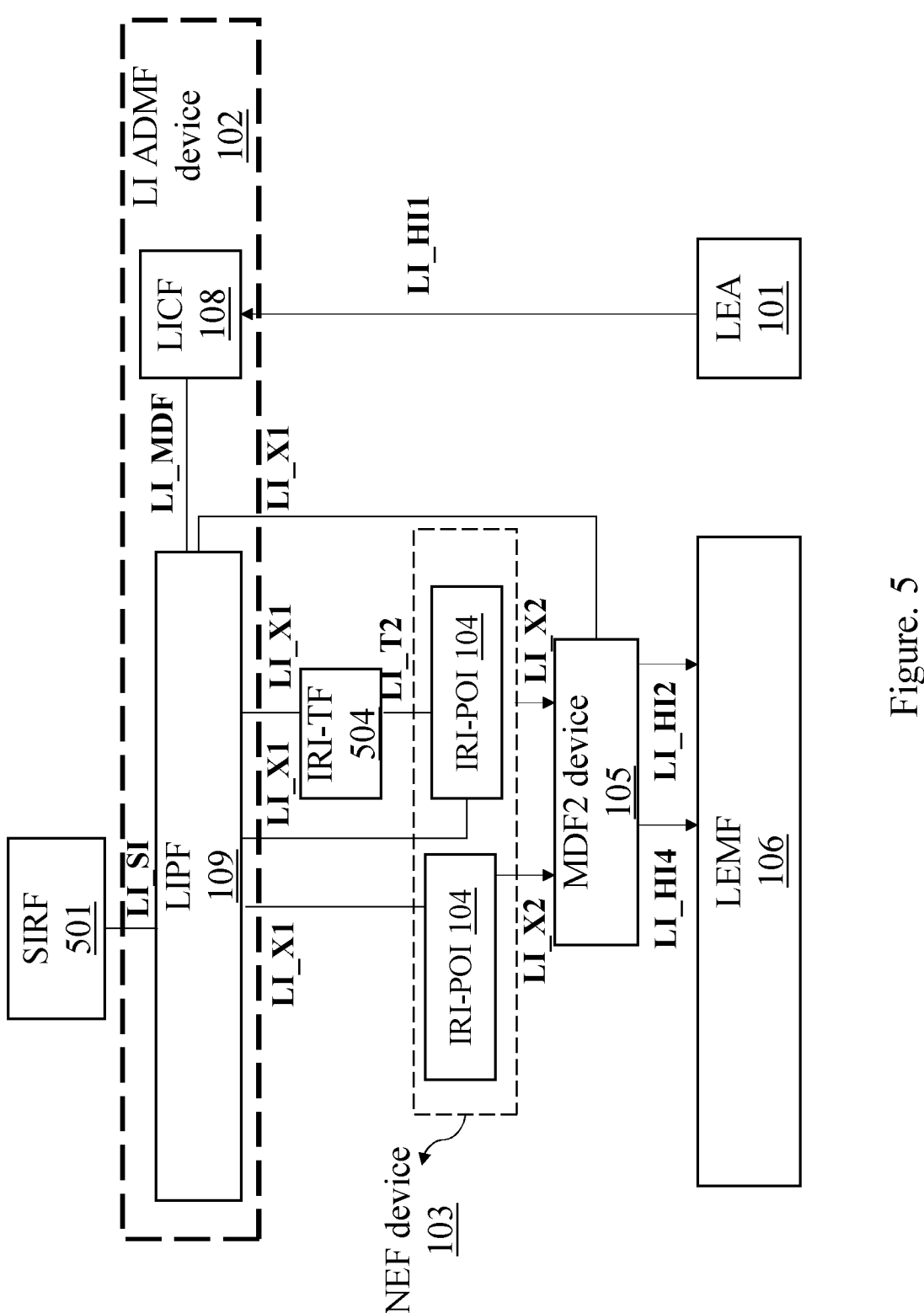
FIG. 5 illustrates a schematic diagram of components of an LI system used in a 5G network.

FIG. 5 illustrates in some more detail LI functionality that may be involved in handling LI information for LI and/or non-LI purposes in a 5G scenario as described herein.

Law Enforcement Agency (LEA) 101:

In general, the LEA 101 is responsible for submitting a warrant for lawful interception to a communications service provider (CSP) whose network is the home network of a subscriber associated with the targeted communicating entity, although in some countries the warrant may be provided by a different legal entity (e.g. judiciary).

Point of Interception (POI) 104:

The IRI-POI 104 detects the target communication, derives the intercept related information (IRI) from the target communications and delivers the POI output as xIRI to the MDF2 device 105. The output of a POI is determined by the type of the network function (cf. above) associated with the IRI-POI 104. As discussed above, the IRI-POI 104 may be embedded within a network function (NF), for example the NEF devices 103, 103b, 103c, or separate from a NF with which it is associated. Multiple POIs may have to be involved in executing a warrant.

Triggering Function (TF) 504:

An IRI-TF504 are provisioned by a LI provisioning function (LIPF) 109 (which will be described in further detail below) and are responsible for triggering triggered and the IRI-POI 104, respectively, in response to network and service events matching the criteria provisioned by the LIPF 109. The IRI-TF504 detect the target communications and send a trigger to the associated triggered IRI-POI 104.

As a part of this triggering, the IRI-TF504 sends all necessary interception rules (i.e. rules that allow the IRI-POI 104 to detect the target communications), forwarding rules (i.e. addresses of the MDF2 device 105, target communicating entity 101, and the correlation information.

A TF may interact with other POIs to obtain correlation information. Details of this interface are outside the scope of the present disclosure.

Mediation and Delivery Function2 (MDF2) Device 105:

The MDF2 device 105 delivers the Interception Product to the LEMF 106. The MDF2 device 105 generates the IRI messages from the xIRI and sends them to one or more LEMFs, e.g. the LEMF 106. The MDF2 device 105 is provisioned by the LIPF 109 with the intercept information necessary to deliver the IRI to one or more LEMFs, e.g. the LEMF 106.

Lawful Interception Administrative function (LI ADMF) device 102: The LI ADMF device 102, which is responsible for the overall management of the LI functionality, includes the two logical functions: a LI control function (LICF) 108 and a LI provisioning function (LIPF) 109. Within the LI ADMF device 102 there is one LICF 108, and at least one, but possibly multiple LIPFs 109. Although not illustrated in FIG. 5, the LI ADMF device 102 also contains the issuing certificate authority (CA) for all LI components (POIs, MDFs etc.).

The LICF 108 controls the management of the end-to-end life cycle of a warrant. The LICF 108 contains a master record of all sensitive information and LI configuration data. The LICF 108 is ultimately responsible for all decisions within the overall LI system. The LICF 108, via the LIPF 109 acting as its proxy, is responsible for auditing other LI components (POIs, MDFs etc.). The LICF 108 is responsible for communication with the LEA101.

The LICF 108 provides intercept information derived from the warrant for provisioning at the IRI-POI 104, IRI-TF504, and the MDF2 device 105. Except for the communication with the LEA 101, all other communication between the LICF 108 and any other entities is proxied by the LIPF 109.

The LICF 108 also maintains and authorizes a master list of POIs, TFs and MDFs. In dynamic networks the LIPF 109 is responsible for providing the LICF 108 with any necessary updates to such a POI/TF and MDF master list.

The LIPF 109 provisions all the applicable POIs, TFs and MDFs, e.g the IRI-POI 104, the IRI-TF504, and the MDF2 device 105. The role of the LIPF 109 varies depending on implementation of network functions and of the LI ADMF device 102 itself (e.g. virtual or non-virtual). In its simplest form, the LIPF 109 is the secure proxy used by the LICF 108 to communicate with POIs, TFs, MDFs, e.g. the IRI-POI 104, the IRI-TF504, the MDF2 device 105 or other infrastructure required to operate LI within the telecommunication network 100. In this scenario the LIPF 109 does not store target information and simply routes LI_X1 messages from and to the LICF 108.

In scenarios where the LI ADMF device 102 is required to take an active role in POI triggering, the LIPF 109 is responsible for receiving triggering information (e.g. from an IRI-TF) and forwarding the trigger to the appropriate POI.

For directly provisioned POIs, TFs and MDFs, e.g. the IRI-POI 104, the IRI-TF504, and the MDF2 device 105, the LIPF 109 will forward all LI administration instructions from the LICF 108 to the intended destination POI, TF or MDF, e.g. the IRI-POI 104, the IRI-TF504, and the MDF2 device 105.

In an SBA, the LIPF 109 may be responsible for identifying changes to NFs, POIs, and TFs and MDFs through interaction with the SIRF501 or underlying virtualization infrastructure.

The LIPF 109 shall notify the LICF 108 of changes affecting the number of active NFs/POIs and TFs or other information which the LICF 108 requires to maintain the master POI/TF and MDF list.

While the LIPF 109 is assumed to be stateful with respect to dynamic interceptions it is managing, it shall not hold the full static target or other historic LI data. If the LIPF 109 is deployed in a virtualized environment, the LIPF 109 shall not store LI information in persistent storage and shall rely on the LICF 108 to manage re-synchronization in the case of LIPF 109 restart.

System Information Retrieval Function (SIRF) 501:

The SIRF501 is responsible for providing the LIPF 109 with the system related information for NFs that are known by the SIRF501 (e.g. service topology). The information provided shall allow the LIPF 109 and LICF 108 to perform the necessary operations to establish and maintain interception of the target service (e.g. provisioning POIs, TFs and MDFs, e.g. the IRI-POI 104, the IRI-TF504, and the MDF2 device 105 over the LI_X1 interface as will be discussed below). LIPF/LICF 109, 108 knowledge of the existence of POI, TF and MDF, e.g. the IRI-POI 104, the IRI-TF504, and the MDF2 device 105, is provided directly by interactions between the LIPF/LICF 109, 108 and the underlying telecommunication network provider's management systems that instantiate NFs.

While the LIPF 109 is responsible for interactions with the SIRF501, the LIPF 109 will forward applicable information to the LICF 108.

Law Enforcement Monitoring Facility (LEMF) 106:

The LEMF 106 receives the interception product (i.e. information pertaining to performed LI) from the MDF2 device 105. However, a detailed description of the LEMF 106 is outside of scope of the present disclosure.

Interface LI_SI

Lawful interception system information interface (LI_SI) is an interface between the SIRF501 and the LIPF 109. The SIRF501 uses this interface to provide the system information to the LIPF 109. The LIPF 109 may request the SIRF501 for such information before sending the intercept provisioning information to the IRI-POI 104. The SIRF501 may also notify the LIPF 109 whenever the status of a system function changes (e.g. removed from service, migrating to another location, etc.).

Interface LI_HI1

Lawful interception handover interface (LI_HI1) is used to send warrants and other interception request information from the LEA 101 to the CSP that provides the telecommunication network 100. This interface may be electronic or may be an offline manual process depending on national warranty processes.

The LI_HI1 interface is modified or adapted to carry one or more information as described below:

TargetIdentifier: Used to identify the communications to be intercepted. It includes the parameter or enumeration value locationArea5G. In case of the embodiment for NIDD event, TargetIdentifier, instead, includes a communication address or a technical identifier used to identify a target of task.

MonitoringType: used by the LEA 101 to request to be notified the number of UEs in a given geographic area, (for example using NUMBER_OF_UES_IN_AN_AREA parameter)

MonitoringMode—used to indicate monitoring up to a maximum number of reports, periodic monitoring along with periodicity (e.g., daily), monitoring up to a maximum duration RequestedData comprising a parameter (or enumerated value) NIDD indicating subscribing to one or more NIDD events Type of intercept: Used to indicate whether IRI only, CC only, or both IRI and CC, is to be delivered to the LEMF 106. In some embodiments according to the present invention, IRI only is used.

Service scope: Used to identify the service (e.g. voice, packet data, messaging, target positioning) to be intercepted.

Filtering criteria: Used to provide additional specificity for the interception (e.g. for bandwidth optimization).

LEMF address: Used to deliver the interception product.

Lawful interception identifier: Used to associate the interception product with the issued warrant.

Interface LI_X1 (Lawful Interception Internal Interface 1)

LI_X1 interfaces are used to manage the POIs, e.g. the IRI-POI 104, and triggering functions, e.g. IRI-TF504, and to provision LI target information on the POIs and TFs to intercept target communications. LI_X1 interfaces are also used to manage and provision mediation and delivery functions, e.g. the MDF2 device 105, with the necessary information to deliver those communications in the correct standard format to LEMFs, e.g. LEMF 106.

LI_X1 Between LIPF and POI

The following are examples of some of the information that may be passed over LI_X1 from the LIPF 109 to the POI, e.g. the IRI-POI 104, as a part of intercept provisioning at the NEF device 103. In other words, the LI_X1 interface is modified or adapted to carry one or more information as described below:

Information necessary to associate multiple xIRI at the MDF2 device, e.g. the MDF2 device 105

Information necessary to provision the IRI-POI at the NEF device, e.g. the NEF device 103

TargetIdentifier (Eg: locationArea5G)

MonitoringType (Eg: NUMBER_OF_UES_IN_AN_AREA)

MonitoringMode (Eg: daily)

Type of intercept (IRI only).

Service scoping

Further filtering criteria

Address of the MDF2 device 105

Address of the NEF device 103

The exact nature of the information passed depends on the role of the POI.

In an embodiment, the LI_X1 interface between the LIPF 109 (in the LI ADMF device 102) and a triggered POI, e.g. the IRI-POI 104, shall be used only for audit and management purposes, and not for provisioning purposes.

LI_X1 Between LIPF and TF

The following are examples of some of the information that may be passed over LI_X1 from the LIPF 109 to the TF, e.g. IRI-TF504, as a part of intercept provisioning. In other words, the LI_X1 interface is modified or adapted to carry one or more information as described below:

Information necessary to associate multiple xIRI at the MDF2 device, e.g. the MDF2 device 105.

TargetIdentifier (Eg: locationArea5G)

MonitoringType (Eg: NUMBER_OF_UES_I-N_AN_AREA)

MonitoringMode (Eg: daily)

Type of Intercept (IRI only)

Service Scoping

Further filtering criteria

Address of the MDF2 device 105

The exact nature of the information passed depends on the role of the TF.

LI_X1 Between LIPF and MDF2 Device

The following are examples of some of the information that may be passed over LI_X1 from the LIPF 109 to the MDF2 device 105, as a part of intercept provisioning:

Information necessary used to associate multiple xIRI at the MDF2 device 105

Target Identifier

Lawful Interception Identifier

Type of Intercept (IRI only)

Service Scoping

Further filtering criteria

Address of LEMF 106

The exact nature of the information passed depends on the role of the MDF.

Interface LI_X2 (Lawful Interception Internal Interface 2)

The LI_X2 interfaces are used to pass xIRI from IRI-POIs, e.g POI 104, to the MDF2 device 105.

The following are some of the information passed over the LI_X2 interface to the MDF2 device 105 as a part of xIRI. In other words, the LI_X2 interface is modified or adapted to carry one or more information as described below:

Target Identifier or Matched Target Identifier (For e.g.: locationArea5G)

Time stamp

Intercept Related Information (IRI) event resulting in xIRI.

It is to be noted however that fully standardised definition of LI_X2 interface is outside the scope of the present disclosure.

Interface LI_T

The LI_T interface is used to pass the triggering information from the triggering function, e.g. IRI-TF504 to the POI, e.g. the IRI-POI 104. Depending on the POI type, two types of LI_T are defined: LI_T2. LI_T2 is used when POI Output is sent over LI_X2.

Interface LI_T2

The LI_T2 interface is from the IRI-TF504 to the IRI-POI 104. The following are some of the information passed over this interface to the IRI-POI 104:

Target Identifier

IRI interception rules

MDF2 device address

Correlation Information.

The IRI interception rules allow the IRI-POI 104 to detect the target communication information to be intercepted.

Interface LI_HI2 (LI_Handover Interface 2)

LI_HI2 is used to send IRI from the MDF2 device 105 to the LEMF 106. This interface is defined in 3GPP TS 33.128 V16.4.0.

LI Operation Notification

The MDF2 device 105 shall support reporting to the LEMF 106 changes to provisioning, including:

Activation of LI

Modification of active LI

Deactivation of LI

It is to be noted that the mechanism may be needed at the CSP to prevent duplicate notifications being raised in the case of LI being provisioned across multiple MDFs.

Contents of the Notification

Each notification shall include at least the following:

The type of notification (e.g. activation, deactivation)

Relevant related information (LIID, time of change)

Interface LI_ADMF

LI_ADMF is an interface between LICF 108 and LIPF 109 and is used by the LICF 108 to send the intercept provisioning information to the LIPF 109.

FIG. 6 is a flowchart illustrating an embodiment of a method performed by the LI ADMF device 102. Referring to FIG. 6, the method comprises:

receiving 601 from the LEA device 101 a first request message for subscribing to a notification of an event, wherein the event is a monitoring event or a NIDD event sending 602 a second request message, to the NEF device 103, 103b comprising the IRI-POI 104 to subscribe to the notification of the event by provisioning the IRI-POI 104 in the NEF device 103, 103b receiving 603 a subscribe response message from the NEF device 103, 103b confirming the subscription to the notification of the event Referring to FIG. 6, the first request message may, for example, be HI1 LI Request message. The second request message may, for example, be a X1 Request message. The subscribe response message may, for example, be a X1 Response message.

FIG. 7 is a flowchart illustrating an embodiment of a method performed by the NEF device 103 such as any one of the NEF devices 103, 103b. Referring to FIG. 7, the method comprises:

receiving 701 at the IRI-POI 104 provisioned in the NEF device 103, 103b, from the LI ADMF device 102, a first request message comprising fields for subscribing to a notification of an event, translating 702 fields comprised in the first request message into fields comprised in a second request message, receiving 703 at the IRI-POI 104 from the NEF 103a, a first subscribe response message, and sending 704 to the LI ADMF device 102, a second subscribe response message, acknowledging the subscription to the notification of the event.

Referring to FIG. 7, the first request message may, for example, be X1 Request message. The second request message may, for example, be a Nnef_EventExposure_Subscribe Request message. The first subscribe response message may, for example, be a Nnef_EventExposure_Subscribe Response. The second subscribe response message may, for example, be a X1 Response.

In an embodiment, the method may further comprise sending to a core network node (such as AMF), a third request message relating to the second request message to subscribe to the notification of the event, wherein the third request message is Namf_EventExposure_Subscribe Request. In another embodiment, the method may still further comprise receiving from the core network node (such as AMF), a subscribe response message indicating subscribing to the notification of the event, wherein the subscribe response message is Namf_EventExposure_Subscribe Response. It may be noted that both these steps are performed after the translating step 702 and before the receiving step 703, respectively.

FIG. 8 is a flowchart illustrating an embodiment of a method performed by the NEF device 103 such as any one of the NEF devices 103, 103c. Referring to FIG. 8, the method comprises:

receiving 801 at the IRI-POI 104 provisioned in the NEF device, a first event notification message notifying the occurrence of an event, translating 802 fields comprised in the first event notification message by mapping one or more fields comprised in the first event notification message to their corresponding fields in a second event notification message, and sending 803 to the MDF2 device, 105 the second event notification message comprising an event report further comprising the translated fields.

Referring to FIG. 8, the first event notification message may, for example, be Nnef_EventExposure_notify. The second event notification message may, for example, be xIRI.

FIG. 9 is a flowchart illustrating an embodiment of a method performed by the MDF2 device 105. Referring to FIG. 9, the method comprises:

receiving 901 from a Network Exposure Function, NEF, device, an event notification message for an event relating to a request message made by the LEA 101, wherein the event notification message comprises an event report, and wherein the event is a monitoring event or a NIDD event, converting 902 an event information comprised in the event report into a standard format, and sending 903 via the LI_HI2 interface, the converted event information comprised in the event report to a LEMF 106.

Referring to FIG. 9, the event notification message may, for example, be a xIRI message.

The sending 903 may comprise sending the converted event information in a EventExposure message.

FIG. 10 illustrates the LI ADMF device 102 comprising one or units in accordance with certain embodiments. For instance, the first receive unit 1001 may be configured to perform the step 601 of FIG. 6, the send unit 1002 may be configured to perform the step 602 of FIG. 6 and the second receive unit 1003 may be configured to perform the step 603 of FIG. 6. It may understood that while in some embodiments, the first receive unit 1001 and the second receive unit 1003 function as separate units, in some other embodiments a single receive unit is configured to perform both the steps 601 and 603 of FIG. 6.

FIG. 11 illustrates the NEF device 103 such as any one of the NEF devices 103, 103b comprising one or more units in accordance with certain embodiments. For instance, the first receive unit 1101 may be configured to perform the step 701 of FIG. 7, the translate unit 1102 may be configured to perform the step 702 of FIG. 7, the second receive unit 1103 may be configured to perform the step 703 of FIG. 7 and the send unit 1104 may be configured to perform the step 704 of FIG. 7. It may understood that while in some embodiments, the first receive unit 1101 and the second receive unit 1103 function as separate units, in some other embodiments a single receive unit is configured to perform both the steps 701 and 703 of FIG. 7.

FIG. 12 illustrates the NEF device 103 such as any one of the NEF devices 103, 103c comprising one or units in accordance with certain embodiments. For instance, the receive unit 1201 may be configured to perform the step 801 of FIG. 8, the translate unit 1202 may be configured to perform the step 802 of FIG. 8 and the send unit 1203 may be configured to perform the step 803 of FIG. 8.

The NEF devices 103, 103b, 103c further comprise the NEF 103a wherein the NEF 103a may, for example, be a software or a hardware performing the functions of NEF as specified in eg: 3GPP technical specification 3GPP TS 23.502 V16.6.0 (2020 September) Clause 5.2.6.

FIG. 13 illustrates the MDF2 device 105 comprising one or units in accordance with certain embodiments. For instance, the receive unit 1301 may be configured to perform the step 901 of FIG. 9, the convert unit 1302 may be configured to perform the step 902 of FIG. 9 and the send unit 1303 may be configured to perform the step 903 of FIG. 9.

The one or more units of FIG. 10-13 may be implemented, in some embodiments, all as software and in some other embodiments all as hardware. In some other embodiments, the one or more units are implemented as a combination of software and hardware. Alternatively, in some other embodiments, some of the units are implemented as software while the rest are implemented as hardware.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 14 is a block diagram illustrating an example of the LI ADMF device 102 comprising one or more processor(s) 1401 and a memory 1402, wherein the memory 1402 (or computer readable storage medium 1402) comprises instructions which when executed by the one or more processors 1401 cause the LI ADMF device 102 to perform one or more steps of the methods according to FIG. 6. The interface 1403 of the LI ADMF device (102) is configured to receive requests and/or send responses over the interfaces, LI_X1 and LI_HI1, in accordance with predetermined protocols.

The computer program product 1404 comprises a computer program 1405, which comprises computer program code loadable into the processor 1401, wherein the computer program 1405 comprises code executed on the LI ADMF device 102 adapted to perform of one or more of the steps of the methods of FIG. 6 and the embodiments described herein, when the computer program code is executed by the processor 1401. In other words, the computer program 1405 may be the LI ADMF device 102 software hosted by the LI ADMF device 102. The interface circuitry 1403 of the LI ADMF device 102 is configured to receive requests and/or send responses over interface, LI_X1, and LI_HI1, in accordance with predetermined protocols.

FIG. 15 is a block diagram illustrating an example of the NEF device 103 such as any one of the NEF devices 103, 103b, 103c comprising one or more processor(s) 1501 and a memory 1502, wherein the memory 1502 (or computer readable storage medium 1502) comprises instructions which when executed by the one or more processors 1501 cause the NEF device to perform one or more steps of the methods according to FIG. 7 and/or FIG. 8. The interface 1503 of the NEF device 103 is configured to receive requests and/or send responses over the interfaces, LI_X1, LI_X2 and Nnef, in accordance with predetermined protocols.

The computer program product 1504 comprises a computer program 1505, which comprises computer program code loadable into the processor 1501, wherein the computer program 1505 comprises code executed on the NEF device 103 such as any one of the NEF devices 103, 103*b*, 103*c* adapted to perform of one or more of the steps of the methods of FIG. 7 and/or FIG. 8 and the embodiments described herein, when the computer program code is executed by the processor 1501. In other words, the computer program 1505 may be the NEF device 103 software hosted by the NEF device 103. The interface circuitry 1503 of the NEF device 103 is configured to receive requests and/or send responses over interface, LI_X1, LI_X2 and Nnef, in accordance with predetermined protocols.

FIG. 16 is a block diagram illustrating an example of the MDF2 device 105 comprising one or more processor(s) 1601 and a memory 1602, wherein the memory 1602 (or computer readable storage medium 1602) comprises instructions which when executed by the one or more processors 1601 cause the MDF2 device 105 to perform one or more steps of the methods according to FIG. 9. The interface 1603 of the MDF2 device 105 is configured to receive requests and/or send responses over the interfaces, LI_HI2 and LI_X2, in accordance with predetermined protocols.

The computer program product 1604 comprises a computer program 1605, which comprises computer program code loadable into the processor 1601, wherein the computer program 1605 comprises code executed on the MDF2 device 105 adapted to perform of one or more of the steps of the methods of FIG. 9 and the embodiments described herein, when the computer program code is executed by the processor 1601. In other words, the computer program 1605 may be an MDF2 software hosted by the MDF2 device 105. The interface circuitry 1603 of the MDF2 device 105 is configured to receive requests and/or send responses over interface, LI_HI2 and LI_X2, in accordance with predetermined protocols.

The devices, namely the LI ADMF device 102, the NEF device 103, the MDF2 device 105 according to FIG. 14, FIG. 15 and FIG. 16 respectively, may have storage and/or processing capabilities. The LI ADMF device 102, the NEF device 103, the MDF2 device 105 may include one or more processors 1401, 1501, 1601 respectively and memory 1402, 1502, 1602 respectively. In particular, in addition to a traditional processor and memory, the LI ADMF device 102, the NEF device 103, the MDF2 device 105 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor(s) 1401, 1501, 1601 may be configured to access (e.g., write to and/or read from) the memory 1402, 1502, 1602, respectively, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

The LI ADMF device 102, the NEF device 103, the MDF2 device 105 may be configured to control any of the methods and/or processes described herein and/or to cause such methods, and/or processes to be performed. Processor 1401, 1501, 1601 corresponds to one or more processors 1401, 1501, 1601, respectively, for performing the LI ADMF device 102, the NEF device 103, the MDF2 device 105 functions described herein. The LI ADMF device 102, the NEF device 103, the MDF2 device 105 includes memory 1402, 1502, 1602 or computer readable storage mediums 1402, 1502, 1602, respectively, that is configured to store data, programmatic software code and/or other information described herein. The memory 1402, 1502, 1602 may include instructions which, when executed by the one or more processors 1401, 1501, 1601, respectively, cause the one or more processors 1401, 1501, 1601 to perform the processes described herein with respect to the LI ADMF device 102, the NEF device 103, the MDF2 device 105, respectively. The instructions may be software (SW) or computer program associated with the LI ADMF device 102, the NEF device 103, the MDF2 device 105.

Thus, the LI ADMF device 102, the NEF device 103, the MDF2 device 105 may further comprise SW or computer program, which is stored in, for example, the memory 1402, 1502, 1602 at the LI ADMF device 102, the NEF device 103, the MDF2 device 105 respectively, or stored in external memory (e.g., database) accessible by the LI ADMF device 102, the NEF device 103, the MDF2 device 105 respectively. The SW or computer program may be executable by the one or more processors 1401, 1501, 1601.

Computer program product 1404, 1504, 1604 may be or comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by one or more processors 1401, 1501, 1601. The computer program product 1404, 1504, 1604 may store any suitable instructions, data or information, including a computer program, software, an application including one or more of logic, rules, code, tables, etc. and/or other instructions capable of being executed by one or more processors 1401, 1501, 1601. memory 1402, 1502, 1602 may be used to store any calculations made by one or more processors 1401, 1501, 1601 respectively. In some embodiments, one or more processors 1401, 1501, 1601 and the computer program product 1404, 1504, 1604 may be considered to be integrated.

ABBREVIATION

3GPP 3rd Generation Partnership Project
5G Fifth generation of cellular mobile communications
5GS 5G System
LI ADMF Lawful Interception Administration Function
AMF Access and Mobility Management Function
CC Content of Communication
CP Control Plane
CSP Communication Service Provider
DNN Data Network Name
ETSI European Telecommunications Standards Institute
GPSI Generic Public Subscription Identifier
HTTP HyperText Transfer Protocol
HTTPS HTTP over TLS
IoT Internet of Things
IP Internet Protocol
IRI Intercept Related Information
LEMF Law Enforcement Monitoring Facility
LI Lawful Interception
LICF Lawful Interception Control Function
LIID Lawful Interception Identifier
LIPF Lawful Interception Provisioning Function
LI_HI1 Lawful Interception Handover Interface 1

LI_HI2 Lawful Interception Handover Interface 2
LI_SI Lawful Interception System Information Interface
LI_X1 Lawful Interception Internal Interface 1
LI_X2 Lawful Interception Internal Interface 2
MDF Mediation Function
NE Network Element
NF Network Function
NEF Network Exposure Function
NFV Network Function Virtualization
NIDD Non-IP Data Delivery
PDU Protocol Data Unit
PEI Permanent Equipment Identifier
POI Point Of Interception
RAN Radio Access Network
SBA Service-Based Architecture
SIRF System Information Retrieval Function
SMF Session Management Function
S-NSSAI Single-Network Slice Selection Assistance
    Information
SUPI Subscriber Permanent Identifier
TLS Transport Layer Security
UE User Equipment
VNF Virtual Network Function
xCC X3 Content of Communication
xIRI X2 Intercept Related Information
LI_X2 Lawful Interception Internal Interface 2
RAM Random Access Memory
ROM Read Only memory
The invention claimed is:

1. A method performed by a Lawful Interception Administration Function, LI ADMF, device the method comprising
    receiving from a Law Enforcement Agency, LEA, a first request message for subscribing to a notification of an event, wherein the event is a monitoring event or a Non-IP Data Delivery, NIDD, event;
    sending a second request message, to a Network Exposure Function, NEF, device comprising an Intercept Related Information Point of Interception, IRI-POI, to subscribe to the notification of the event by provisioning the IRI-POI in the NEF device; and
    receiving a subscribe response message from the NEF device confirming the subscription to the notification of the event.

2. A method performed by a Network Exposure Function, NEF, device, the method comprising:
    receiving at an Intercept Related Information Point of Interception, IRI-POI (104) provisioned in the NEF device, from an LI ADMF device, a first request message comprising fields for subscribing to a notification of an event;
    translating fields comprised in the first request message into fields comprised in a second request message;
    receiving at the IRI-POI from the NEF, a first subscribe response message; and
    sending to the LI ADMF device, a second subscribe response message, acknowledging the subscription to the notification of the event.

3. The method according to claim 2, wherein the first request message comprises a RequestedData field for a Non-IP Data Delivery, NIDD, event, wherein the RequestedData comprises a parameter (or enumerated value) NIDD.

4. A method performed by a Network Exposure Function, NEF, device, the method comprising
    receiving at an Intercept Related Information Point of Interception, IRI-POI, provisioned in the NEF device, a first event notification message notifying the occurrence of an event;

translating fields comprised in the first event notification message by mapping one or more fields comprised in the first event notification message to their corresponding fields in a second event notification message; and
    sending to a Mediation and Delivery Function 2, MDF2, device, the second event notification message comprising an event report further comprising the translated fields.

5. A method performed by a Mediation and Delivery Function 2, MDF2 device, the method comprising:
    receiving from a Network Exposure Function, NEF, device, an event notification message for an event relating to a request message made by a Law Enforcement Agency, LEA, wherein the event notification message comprises an event report, and wherein the event is a monitoring event or a Non-IP Data Delivery, NIDD, event;
    converting an event information comprised in the event report into a standard format; and
    sending, via the Lawful Interception Handover Interface 2, LI_HI2, interface, the converted event information comprised in the event report to a Law Enforcement Monitoring Facility, LEMF.

6. A Lawful Interception Administration Function, LI ADMF, device, comprising a one or more processor(s) and a memory, the memory containing instructions which when executed by the one or more processor(s), cause the LI ADMF device to:
    receive from a Law Enforcement Agency, LEA, a first request message for subscribing to a notification of an event, wherein the event is a monitoring event or a Non-IP Data Delivery, NIDD, event;
    send a second request message to a Network Exposure Function, NEF, device comprising an Intercept Related Information Point of Interception, IRI-POI, to subscribe to the notification of the event by provisioning the IRI-POI in the NEF device; and
    receive a subscribe response message from the NEF device confirming the subscription to the notification of the event.

7. A Network Exposure Function, NEF, device comprising one or more processor(s) and a memory, the memory containing instructions executable by the one or more processor(s) (1501), to:
    receive at an Intercept Related Information Point of Interception, IRI-POI provisioned in the NEF device, from a Lawful Interception Administration Function, LI ADMF, device, a first request message comprising fields for subscribing to a notification of an event;
    translate the fields comprised in the first request message into fields comprised in a second request message;
    receive at the IRI-POI from the NEF, a first subscribe response message; and
    send to the LI ADMF device, a second subscribe response message, acknowledging the subscription to the notification of the event.

8. The NEF device according to claim 7, wherein the first request message comprises a RequestedData field for a Non-IP Data Delivery, NIDD, event, wherein the RequestedData comprises a parameter (or enumerated value) NIDD.

9. A Network Exposure Function, NEF, device comprising a one or more processor(s) and a memory, the memory containing instructions executable by the one or more processor(s), cause the NEF device to receive at an Intercept Related Information Point of Interception, IRI-POI, provisioned in the NEF device, a first event notification message notifying the occurrence of an event;

translate fields comprised in the first event notification message by mapping one or more fields comprised in the first event notification message to their corresponding fields in a second event notification message; and send to a Mediation and Delivery Function 2, MDF2, device, the second event notification message comprising an event report further comprising the translated fields.

10. A Mediation and Delivery Function 2, MDF2, device, comprising one or more processor(s) and a memory, the memory containing instructions executable by the one or more processor(s), to:

receive from a Network Exposure Function, NEF, device, an event notification message for an event relating to a request message made by a Law Enforcement Agency, LEA, (101), wherein the event notification message comprises an event report, and wherein the event is a monitoring event or a Non-IP Data Delivery, NIDD, event;

convert an event information comprised in the event report into a standard format; and send, via the Lawful Interception Handover Interface 2, LI_HI2, interface, the converted event information comprised in the event report to a Law Enforcement Monitoring Facility, LEMF.

* * * * *